(12) United States Patent
Louwet et al.

(10) Patent No.: US 7,147,936 B2
(45) Date of Patent: *Dec. 12, 2006

(54) LAYER CONFIGURATION WITH IMPROVED STABILITY TO SUNLIGHT EXPOSURE

(75) Inventors: Frank Louwet, Diepenbeek (BE); Geert Van Dyck, Hamme (BE); Johan Loccufier, Zwijnaarde (BE); Bert Groenendaal, Sinaai (BE); Hieronymus Andriessen, Beerse (BE)

(73) Assignee: Agfa Gevaert, Mortsel (BE)

( * ) Notice: Subject to any disclaimer, the term of this patent is extended or adjusted under 35 U.S.C. 154(b) by 474 days.

This patent is subject to a terminal disclaimer.

(21) Appl. No.: 10/642,933

(22) Filed: Aug. 18, 2003

(65) Prior Publication Data

US 2004/0043895 A1 Mar. 4, 2004

Related U.S. Application Data

(60) Provisional application No. 60/409,794, filed on Sep. 11, 2002.

(30) Foreign Application Priority Data

Aug. 23, 2002 (EP) .................................. 02102217

(51) Int. Cl.
*C07D 211/021* (2006.01)
*H01L 51/50* (2006.01)

(52) U.S. Cl. ................. 428/690; 428/411.11; 428/917; 313/504; 313/506; 257/40

(58) Field of Classification Search ................. 428/690, 428/917, 411.11; 257/40, 99; 313/504, 506
See application file for complete search history.

(56) References Cited

U.S. PATENT DOCUMENTS 5,705,888 A * 1/1998 Staring et al. ............... 313/503

6,333,145 B1 12/2001 Cloots et al.
2004/0044214 A1 * 3/2004 Andriessen ................. 546/185

FOREIGN PATENT DOCUMENTS

EP 0 339 340 A3 11/1989

(Continued)

OTHER PUBLICATIONS

Groenendaal et al; *Advanced Materials*, vol. 12 (7), 481-494 (Apr. 2000).

(Continued)

*Primary Examiner*—Dawn Garrett
*Assistant Examiner*—Camie S. Thompson
(74) *Attorney, Agent, or Firm*—Leydig, Voit &Mayer, Ltd.

(57) ABSTRACT

A layer configuration on a support, the layer configuration comprising a layer containing a polymer containing optionally substituted 3,4-alkylenedioxythiophene structural units, in which the two alkoxy groups may be the same or different or together represent an optionally substituted oxy-alkyleneoxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

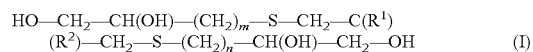

Figure 1:
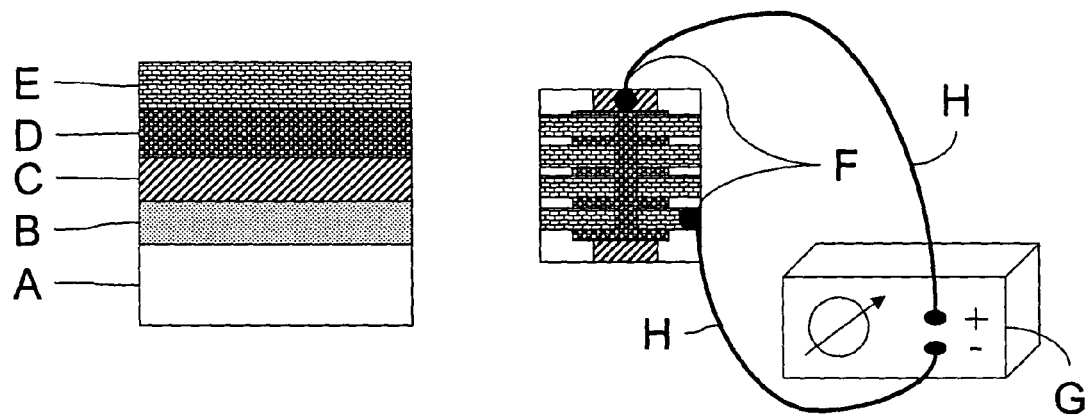
Figure 1:
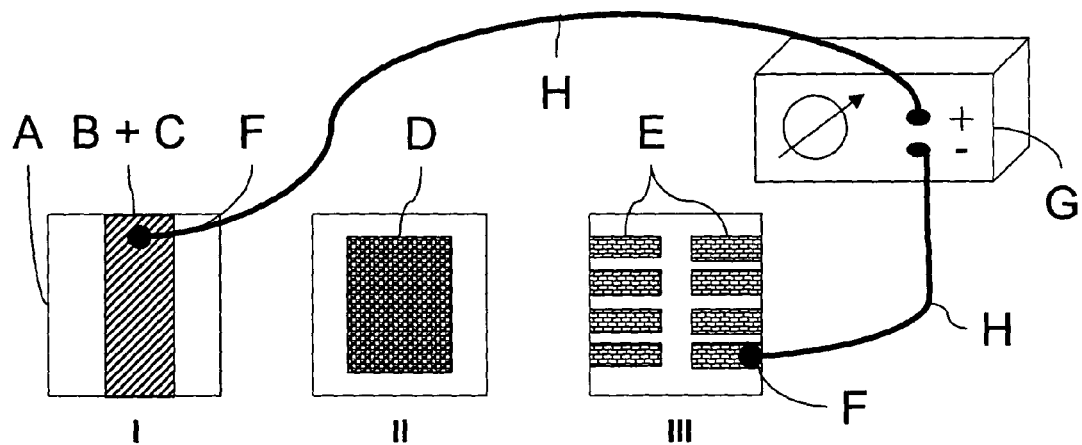

wherein $R^1$ and $R^2$ are independently H, —OH or alkyl, and n and m are independently 1, 2 or 3; compounds according to formula (II):

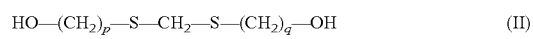

wherein p and q are independently 2, 3 or 4; compounds hydrolyzable to tetronic acid derivatives; compounds hydrolyzable to compounds according to formula (I); and sulphosubstituted 2-thia-alkyl-benzimidazole compounds.

48 Claims, 1 Drawing Sheet

FOREIGN PATENT DOCUMENTS

| | | |
|---|---|---|
| EP | 0 440 957 A2 | 8/1991 |
| EP | 0 686 662 A2 | 12/1995 |
| EP | 1 079 397 A1 | 2/2001 |
| EP | 1 122 274 A1 | 8/2001 |
| WO | WO 01/78464 A1 | 10/2001 |

OTHER PUBLICATIONS

Lee et al.; *Advanced Materials*, vol. 13 (16), 1274-1278, (Aug. 2001).

Lee et al; *J. of Applied Physics*, vol. 90 (5), 2128-2134 (Sep. 2001).

Search Report for EP 02 10 2217 (Dec. 17, 2002).

* cited by examiner

US 7,147,936 B2

LAYER CONFIGURATION WITH IMPROVED STABILITY TO SUNLIGHT EXPOSURE

This application claims the benefit of U.S. Provisional Application No. 60/409,794 filed Sep. 11, 2002, which is incorporated by reference. In addition, this application claims the benefit of European Application No. 02102217.3 filed Aug. 23, 2002, which is also incorporated by reference.

FIELD OF THE INVENTION

The present invention relates to a layer configuration with improved stability to visible and UV light exposure.

BACKGROUND OF THE INVENTION

Polythiophenes have been studied extensively due to their interesting electrical and/or optical properties. Polythiophenes become electrically conducting upon chemical or electrochemical oxidation or reduction.

EP-A 339 340 discloses a polythiophene containing structural units of the formula:

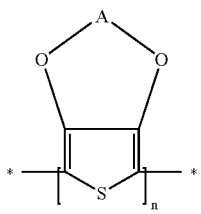

in which A denotes an optionally substituted $C_{1-4}$-alkylene radical and its preparation by oxidative polymerization of the corresponding thiophene.

EP-A 440 957 discloses dispersions of polythiophenes, constructed from structural units of formula (I):

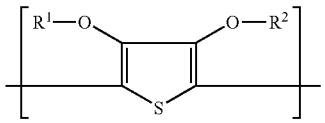

in which $R^1$ and $R^2$ independently of one another represent hydrogen or a $C_{1-4}$-alkyl group or together form an optionally substituted $C_{1-4}$-alkylene residue, in the presence of polyanions.

EP-A 686 662 discloses mixtures of A) neutral polythiophenes with the repeating structural unit of formula (I),

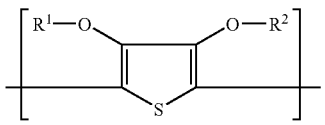

in which $R^1$ and $R^2$ independently of one another represent hydrogen or a C1–C4 alkyl group or together represent an optionally substituted C1–C4 alkylene residue, preferably an optionally with alkyl group substituted methylene, an optionally with C1–C12-alkyl or phenyl group substituted 1,2-ethylene residue or a 1,2-cyclohexene residue, and B) a di- or polyhydroxy- and/or carboxy groups or amide or lactam group containing organic compound; and conductive coatings therefrom which are tempered to increase their resistance preferably to <300 ohm/square. Examples of di- and polyhydroxy organic compounds disclosed in EP-A 686 662 are: sugar and sugar derivatives, such as saccharose, glucose, fructose, lactose, sugar alcohols, such as sorbitol and mannitol, and alcohols such as ethylene glycol, glycerine, diethylene glycol and triethylene glycol.

EP-A 1 122 274 discloses a process for preparing water-soluble π-conjugated polymers, characterized in that the monomer thiophene derivative according to formula (I)

in which X and Y are independently O, S, N—$R^1$, Z is —$(CH_2)_m$—$CR^2R^3$—$(CH_2)_n$—; $R^1$ is aryl, $C_{1-18}$-alkyl or hydrogen; $R^2$ is hydrogen or —$(CH_2)_s$—O—$(CH_2)_p$—$SO_3^-$$M^+$; $R^3$ is —$(CH_2)_s$—O—$(CH_2)_p$—$SO_3^-M^+$; $M^+$ is a cation; m and n are independently a whole number from 0 to 3; s is a whole number from 0 to 10; and p is a whole number from 1 to 18; is polymerized by an oxidation agent in aqueous solution.

WO 01/78464 discloses in an organic/polymer electroluminescent (EL) device which comprises: a transparent substrate; a semitransparent electrode deposited on the transparent substrate; a hole-injecting layer positioned on the semitransparent electrode; an emissive layer made of an organic EL-material, positioned on the hole-injecting layer; and electron-injecting layer positioned on the electron-injecting layer, the improvement comprising that single-ion conductors are employed for the hole-injecting layer and the electron-injecting layer. The specification does not define the meaning of the term "single-ion conductor", which in plain language means a conductor of a single ion, although claim 9 teaches that the single ion conductor can be a single-cation conductor or a single anion conductor and claim 10 teaches that such single ion conductors can be represented as a general formula (I) or (II), comprising ether chain [—$(CH_2)_nO$—] such as polyethylene oxide or polypropylene oxide in the main chain, and contains anions such as $SO_3^-$, $COO^-$ or $I^-$ in the main side chains that form ionic bonds with counter ions such as Na$^+$, Li$^+$, Zn$^{2+}$, Mg$^{2+}$, Eu$^{3+}$, or $(NH_3)_4^+$:

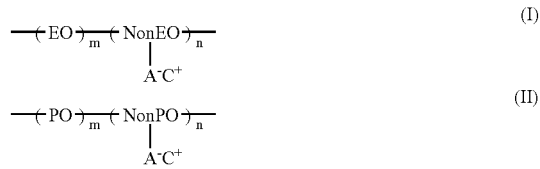

wherein, EO represents ethylene oxide; Non-EO represents non-ethylene oxide; PO represents propylene oxide; Non- PO represents non-propylene oxide; A⁻ represents anion; C⁺ represents cation; m+n=11 and n represents a real number more than 0 and less than 1.

T. -W. Lee and O. O. Park disclosed in 2001 in Advanced Materials, volume 13, pages 1274–1278, polymer light-emitting energy-well devices using single-ion conductors (SIC's) in which charge injection and its confinement simultaneously in EL devices is striven for by using both a single-cationic conductor (SCC) and a single-anionic conductor (SAC), which "greatly improve the charge injection due to accumulation of the mobile ions near the electrodes" with the aim of "confining well-electrons and holes leading to enhanced recombination rate of the pairs" in devices in which "the mobile ions to play a key role in improvement of charge injection are separately located near both electrodes in the structure of a sandwiched multi-layer device instead of blending with the emitting material so that the problem of phase separation of the emitting materials can be avoided". They further disclose that ionic polyurethane possesses good mechanical properties and high ionic conductivity with a single-ion transport character and that SIC's are generally of two different types: one is a polymer blend of an ionomer and polyether which usually possesses poor mechanical properties and the other is the copolymer of an oligomeric ionomer with polyether. They also disclosed that incorporation of the SIC's with soft and hard blocks into the EL devices dramatically improves not only luminance but also the efficiency and that SCC's possess electron-injecting and hole-blocking properties and SAC's possess hole-injecting and electron-blocking properties.

T. -W. Lee et al. disclosed in 2001 in Journal of Applied Physics, volume 90, pages 2128–2134, a study of the effect of ion concentration, neutralization level and counterions in ionomers to obtain the optimal electroluminescent (EL) characteristics in polymer light-emitting diodes using poly[2-methoxy-5-(2'-ethyl-hexyloxy)-1,4-phenylenevinylene] (MEH-PPV) for the emissive layer and sulphonated polystyrene (SPS) ionomers for the electron-injecting layer.

A general problem in electronic devices, particularly in light emitting diodes, is undesirable hole-electron recombination at the positive electrode thereby reducing the efficiency and lifetime of the device.

A general drawback of electroconductive layers containing poly(3,4-dialkoxythiophene) polymers in the presence of a polyanion is the rapid increase in their surface resistance upon exposure to visible and UV light.

Aspects of the Invention

It is therefore an aspect of the present invention to provide electroconductive layers containing poly(3,4-dialkoxythiophene) polymers in the presence of a polyanion which do not undergo a rapid increase in their surface resistance upon exposure to visible and ultraviolet light.

It is a further aspect of the present invention to provide a layer between a positive electrode and a material capable of hole transport capable of reducing hole-electron recombination at the positive electrode thereby increasing the efficiency and lifetime of electronic devices containing such layer configurations.

Further aspects and advantages of the invention will become apparent from the description hereinafter.

SUMMARY OF THE INVENTION

It has been surprisingly found that the increase in surface resistance upon exposure to visible and UV light of electroconductive layers containing poly(3,4-dialkoxythiophene) polymers in the presence of a polyanion is substantially reduced upon incorporating polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

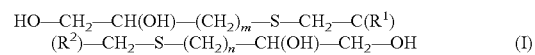

wherein R¹ and R² are independently H, —OH or alkyl, and n and m are independently 1, 2 or 3; compounds according to formula (II):

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

It has also been surprisingly found that the use of a layer containing a polyphosphoric acid and poly[4-(2,3-dihydro-thieno[3,4-b][1,4]dioxin-2-ylmethoxy)-butane-1-sulphonic acid] between a positive electrode and a material capable of hole transport improves the device performance by increasing the lifetime and, in the case of light emitting diodes, reducing the optimal voltage.

Aspects of the present invention are realized by a layer configuration on a support, the layer configuration comprising a layer containing a polymer containing optionally substituted 3,4-alkylenedioxythiophene structural units, in which the two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

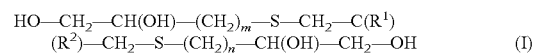

wherein R¹ and R² are independently H, —OH or alkyl, and n and m are independently 1, 2 or 3; compounds according to formula (II):

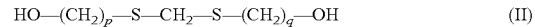

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

Preferred embodiments are disclosed in the dependent claims.

DETAILED DESCRIPTION OF THE INVENTION

FIG. 1 is a schematic representation of a side view and a top view of the layer configuration used in devices 2 to 10 and the circuit used for obtaining electroluminescence in which:
A represents a poly(ethylene terephthalate) support;
B represents an sputtered ITO layer;
C represents an electron blocking layer;
D represents an electroluminescent layer containing ZnS:Cu nano-particles and a binder;

E represents an evaporated aluminium electrode
F represents conductive silver paste dots for contacting
G represents an IV-power source (Power Supply ES 030-5 from Delta Elektronica)
H represents electric conductive copper wires
I indicates the first layer
II indicates the second layer
III indicates the third layer

Definitions

The term alkyl means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term thia-alkyl means a thia-alkyl group with one or more sulphur atoms in the alkyl chain e.g. 2,6-dithia-octyl, 3,6-dithia-octyl, 1,4-dithia-octyl, 1,4-dithiahexyl and 1,4,7-trithia-heptyl.

The term aqueous for the purposes of the present invention means containing at least 60% by volume of water, preferably at least 80% by volume of water, and optionally containing water-miscible organic solvents such as alcohols e.g. methanol, ethanol, 2-propanol, butanol, iso-amyl alcohol, octanol, cetyl alcohol etc.; glycols e.g. ethylene glycol; glycerine; N-methyl pyrrolidone; methoxypropanol; and ketones e.g. 2-propanone and 2-butanone etc.

The term carboxy as used in disclosing the present invention is a carboxylic acid group or a salt thereof.

The term sulfo as used in disclosing the present invention is a sulfonic acid group or a salt thereof.

The term sulfonato as used in disclosing the present invention is a —SO$_4$H group or a salt thereof.

The abbreviation PEDOT represent poly(3,4-ethylene-dioxy-thiophene).

The abbreviation PEDOT-S represents poly[4-(2,3-dihydro-thieno[3,4-b][1,4]dioxin-2-ylmethoxy)-butane-1-sulphonic acid].

The abbreviation PSS represents poly(styrenesulphonic acid) or poly(styrenesulphonate).

The abbreviation PPA represents polyphosphoric acid.

The abbreviation OTs represents a tosylate group.

The passage "material capable of transporting holes" as used in disclosing the present invention means a material into which holes can be injected and through which holes can be transported, preferably having a hole mobility $>10^{-8}$ cm$^2$ V$^{-1}$ s$^{-1}$ and particularly preferably having a hole mobility $>10^{-6}$ cm$^2$ V$^{-1}$ s$^{-1}$ as measured by time of flight techniques or in a field effect transistor. Charge transport also takes place in capacitive devices, since the emission is a result of the energy resulting from electron-hole combination.

Layer Configuration

Aspects of the present invention are realized with a layer configuration on a support, the layer configuration comprising a layer containing a polymer containing optionally substituted 3,4-alkylenedioxythiophene structural units, in which the two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxy-benzene compounds with at least one sulpho group, compounds according to formula (I):

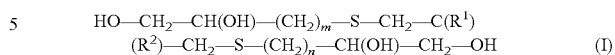

wherein R$^1$ and R$^2$ are independently H, —OH or alkyl, and n and m are independently 1, 2 or 3; compounds according to formula (II):

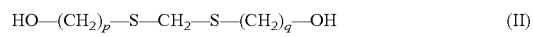

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

According to a first embodiment of the layer configuration, according to the present invention, the layer further contains a surfactant.

According to a second embodiment of the layer configuration, according to the present invention, the layer further contains a binder.

According to a third embodiment of the layer configuration, according to the present invention, the layer further contains a cross-linking agent.

Polymer Containing Optionally Substituted 3,4-alkylenedioxythiophene Structural Units The polymer, according to the present invention, contains optionally substituted 3,4-alkylenedioxythiophene structural units in which the two alkoxy groups may be the same or different or together represent an optionally substituted oxy-alkylene-oxy bridge.

According to a fourth embodiment of the layer configuration, according to the present invention, the polymer is selected from the group consisting of: poly(3,4-methylene-dioxy-thiophene), poly(3,4-methylenedioxythiophene) derivatives, poly(3,4-ethylenedioxy-thiophene), poly(3,4-ethylenedioxy-thiophene) derivatives, poly(3,4-propylene-dioxythiophene), poly(3,4-propylenedioxythiophene) derivatives, poly(3,4-butylenedioxythiophene), poly(3,4-butylenedioxythiophene) derivatives and copolymers therewith. The term derivatives used in disclosing the fourth embodiment of the layer configuration, according to the present invention, means that the monomers are substituted.

According to a fifth embodiment of the layer configuration, according to the present invention, the substituents for the oxy-alkylene-oxy bridge are alkyl, alkoxy, alkyloxyalkyl, alkyloxyalkylenecarboxy, alkyloxyalkylenesulfo, carboxy, alkylsulphonato and carboxy ester groups.

According to a sixth embodiment of the layer configuration, according to the present invention, the optionally substituted oxy-alkylene-oxy bridge is a 1,2-ethylene group, an optionally alkyl-substituted methylene group, an optionally C$_{1-12}$-alkyl- or phenyl-substituted 1,2-ethylene group, a 1,3-propylene group or a 1,2-cyclohexylene group.

According to a seventh embodiment of the layer configuration, according to the present invention, the optionally substituted 3,4-alkylenedioxythiophene structural units are represented by formula (III):

(III)

in which X and Y are O, Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18.

According to an eighth embodiment of the layer configuration, according to the present invention, the polymer containing optionally substituted 3,4-alkylenedioxythiophene structural units is a polythiophene according to formula (IV)

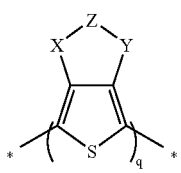

(IV)

in which X and Y are O, Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18; and q is a whole number from 2 to 10,000.

According to a ninth embodiment of the layer configuration, according to the present invention, the polymer containing optionally substituted 3,4-alkylenedioxythiophene structural units is poly[4-(2,3-dihydro-thieno[3,4-b][1,4]dioxin-2-ylmethoxy)-butane-1-sulphonic acid].

According to a tenth embodiment of the layer configuration, according to the present invention, the polymer containing optionally substituted 3,4-alkylenedioxythiophene structural units is poly(3,4-ethylenedioxythiophene).

Polymers, according to the present invention, can be polymerized chemically or electrochemically. Chemical polymerization can be carried out oxidatively or reductively. The oxidation agents used for the oxidative polymerisation of pyrrole, as described, for example, in Journal of the American Chemical Society, volume 85, pages 454–458 (1963) and J. Polymer Science Part A Polymer Chemistry, volume 26, pages 1287–1294 (1988), can be utilized for the oxidative polymerization of such polymers.

According to an eleventh embodiment of the present invention, the inexpensive and easily accessible oxidation agents such as iron(III) salts such as FeCl$_3$, the iron(III) salts of organic acids, e.g. Fe(OTs)$_3$, H$_2$O$_2$, K$_2$Cr$_2$O$_7$, alkali and ammonium persulphates, alkali perborates and potassium permanganate are used in the oxidative polymerization.

Theoretically the oxidative polymerization of thiophenes requires 2.25 equivalents of oxidation agent per mole thiophene of formula (III) [see e.g. J. Polymer Science Part A Polymer Chemistry, volume 26, pages 1287–1294 (1988)]. In practice an excess of 0.1 to 2 equivalents of oxidation agent is used per polymerizable unit. The use of persulphates and iron(III) salts has the great technical advantage that they do not act corrosively. Furthermore, in the presence of particular additives oxidative polymerization to the polymers, according to the present invention, proceeds so slowly that the thiophenes and oxidation agent can be brought together as a solution or paste and applied to the substrate to be treated. After application of such solutions or pastes the oxidative polymerization can be accelerated by heating the coated substrate as disclosed in U.S. Pat. No. 6,001,281 and WO 00/14139 herein incorporated by reference.

Reductive polymerization can be performed using the Stille (organotin) or Suzuki (organoboron) routes described in 2002 by Appperloo et al. in Chem. Eur. Journal, volume 8, pages 2384–2396, and as disclosed in 2001 in Tetrahedron Letters, volume 42, pages 155–157 and in 1998 in Macromolecules, volume 31, pages 2047–2056 respectively or with nickel complexes as disclosed in 1999 in Bull. Chem. Soc. Japan, volume 72, page 621 and in 1998 in Advanced Materials, volume 10, pages 93–116.

Optionally substituted 3,4-dialkoxythiophene structural units, according to the present invention, can be chemically or electrochemically copolymerized with other thiophene monomer or polymerizable heterocyclic compounds such as pyrrole.

Polyphosphoric Acids and Salts Thereof

Aspects of the present invention are realized with a layer configuration on a support, the layer configuration comprising a layer containing a polyphosphoric acid and/or a salt thereof and a polymer containing optionally substituted 3,4-alkylenedioxythiophene structural units.

According to a twelfth embodiment of the layer configuration, according to the present invention, the weight ratio of polyphosphoric acid to the polymer containing optionally substituted 3,4-alkylenedioxythiophene structural units is between 0.4 and 10.

Polyphosphoric acids include diphosphoric acid, pyrophosphoric acid, triphosphoric acid, tetraphosphoric acid, metaphosphoric acid and "polyphosphoric acid".

Polyphosphoric acid may be prepared by heating H$_3$PO$_4$ with sufficient P$_4$O$_{10}$ (phosphoric anhydride) or by heating H$_3$PO$_4$ to remove water. A P$_4$O$_{10}$/H$_2$O mixture containing 72.74% P$_4$O$_{10}$ corresponds to pure H$_3$PO$_4$, but the usual commercial grades of the acid contain more water. As the P$_4$O$_{10}$ content H$_4$P$_2$O$_7$, pyrophosphoric acid, forms along with P$_3$ through P$_8$ polyphosphoric acids. Triphosphoric acid appears at 71.7% P$_2$O$_5$ (H$_5$P$_3$O$_{10}$) and tetraphosphoric acid (H$_6$P$_4$O$_{13}$) at about 75.5% P$_2$O$_5$. Such linear polyphosphoric acids have 2 to 15 phosphorus atoms, which each bear a strongly acidic OH group. In addition, the two terminal P atoms are each bonded to a weakly acidic OH group. Cyclic polyphosphoric acids or metaphosphoric acids, H$_n$P$_n$O$_{3n}$, which are formed from low-molecular polyphosphoric acids by ring closure, have a comparatively small number of ring atoms (n=3–8). Each atom in the ring is bound to one strongly acidic OH group. High linear and cyclic polyphosphoric acids are present only at acid concentrations above 82% P$_2$O$_5$. Commercial phosphoric acid has a 82 to 85% by weight P$_2$O$_5$ content. It consists of about 55% tripolyphosphoric acid, the remainder being H$_3$PO$_4$ and other polyphosphoric acids.

The polyphosphoric acid can be added both during the preparation of the PEDOT/PSS dispersion used in preparing the dispersion for coating the PEDOT/PSS-containing layer i.e. as an additive to the washing water during the ultrafiltration process and subsequent to the polymerization of EDOT. A polyphosphoric acid suitable for use according to the present invention is a 84% (as $P_2O_5$) polyphosphoric acid supplied by ACROS (Cat. No. 19695-0025).

Thia-alkanedicarboxylic Acids

Aspects of the present invention are realized with a layer configuration on a support, the layer configuration comprising a layer containing a thia-alkanedicarboxylic acid and a polymer containing optionally substituted 3,4-alkylenedioxythiophene structural units.

Suitable thia-alkanedicarboxylic acids include:

| thia-alkanedicarboxylic acid (TADCA) nr. | structural formula |
|---|---|
| TADCA01 | HO—C(=O)—(CH$_2$)$_2$—S—(CH$_2$)$_2$—C(=O)—OH |
| TADCA02 | HO—C(=O)—CH$_2$—S—(CH$_2$)$_2$—S—CH$_2$—C(=O)—OH |
| TADCA03 | HO—C(=O)—(CH$_2$)$_2$—S—(CH$_2$)$_2$—S—(CH$_2$)$_2$—C(=O)—OH |

Cyclohexadiene Compounds

Aspects of the present invention are realized with a layer configuration on a support, the layer configuration comprising a layer containing a cyclohexadiene compound and a polymer containing optionally substituted 3,4-alkylenedioxythiophene structural units.

Suitable cyclohexadiene compounds include:

| cyclohexadiene compound (CHDC) nr. | structural formula |
|---|---|
| CHDC01 | (1,4-cyclohexadiene-1,4-diyl)bis(acetate) [Na$^+$]$_2$ |

Polyhydroxy-Compounds

Aspects of the present invention are realized with a layer configuration on a support, the layer configuration comprising a layer containing a polyhydroxy-compound selected from the group consisting of tetronic acid derivatives; ortho-dihydroxybenzene compounds with at least one sulpho group, compounds according to formula (I):

$$HO—CH_2—CH(OH)—(CH_2)_m—S—CH_2—C(R^1)(R^2)—CH_2—S—(CH_2)_n—CH(OH)—CH_2—OH \quad (I)$$

wherein $R^1$ and $R^2$ are independently H, —OH or alkyl, and n and m are independently 1, 2 or 3; compounds according to formula (II):

$$HO—(CH_2)_p—S—CH_2—S—(CH_2)_q—OH \quad (II)$$

wherein p and q are independently 2, 3 or 4; and a polymer containing optionally substituted 3,4-alkylenedioxythiophene structural units.

Suitable compounds according to formula (I) include:

| polyhydroxy-compound (PHC) nr. | structural formula |
|---|---|
| PHC01 | 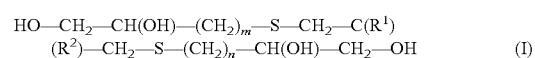 |
| PHC02 | 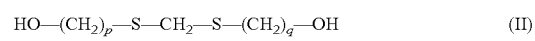 |
| PHC03 | HO—CH$_2$—CH(OH)—CH$_2$—S—CH$_2$—CH(OH)—CH$_2$—S—CH$_2$—CH(OH)—CH$_2$—OH |

Suitable compounds according to formula (II) include:

| polyhydroxy-compound (PHC) nr. | structural formula |
|---|---|
| PHC11 | HO–(CH₂)₂–S–CH₂–S–(CH₂)₂–OH |

Tetronic acid derivatives include ascorbic acid, carolic acid, carlosic acid, carolinic acid and carlic acid.

Suitable tetronic acid derivatives include:

| tetronic acid derivative (TAD) nr. | structural formula |
|---|---|
| TAD01 |  |
| TAD02 | |
| TAD03 | |
| TAD04 | |

Suitable ortho-dihydroxybenzene [ODHB] compounds with at least one sulpho group include:

| | structural formula | |
|---|---|---|
| ODHB01 | | 1,2-dihydroxy-3,5-disulphobenzene |
| ODHB02 | | 1,2-dihydroxy-4-sulphobenzene |

Aspects of the present invention are realized with a layer configuration on a support, the layer configuration comprising a layer containing a polymer containing optionally substituted 3,4-alkylenedioxy-thiophene structural units; and a compound hydrolyzable to a tetronic acid derivative and/or a compound hydrolyzable to compounds according to formula (I).

Polyhydroxy-compounds according to formula (I) can be obtained by the hydrolysis of epoxy compounds.

Sulpho-Substituted 2-thia-alkyl-benzimidazole Compounds

Aspects of the present invention are realized with a layer configuration on a support, the layer configuration comprising a layer containing a sulpho-substituted 2-thia-alkyl-benzimidazole compound [SSTAB] and a polymer containing optionally substituted 3,4-alkylenedioxythiophene structural units.

According to a thirteenth embodiment of the layer configuration, according to the present invention, the sulpho-substituted 2-thia-alkyl-benzimidazole compound is represented by formula (V):

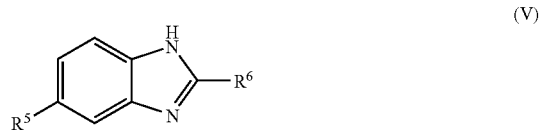

(V)

wherein $R^5$ is hydrogen or a sulpho group; $R^6$ is a thia-alkyl group optionally substituted with a sulpho group and/or an optionally substituted 2-benzimidazolyl group; and $R^6$ contains at least one sulpho group if $R^5$ is hydrogen.

Suitable sulpho-substituted 2-thia-alkyl-benzimidazole compounds [SSTAB] include:

| structural formula |
|---|
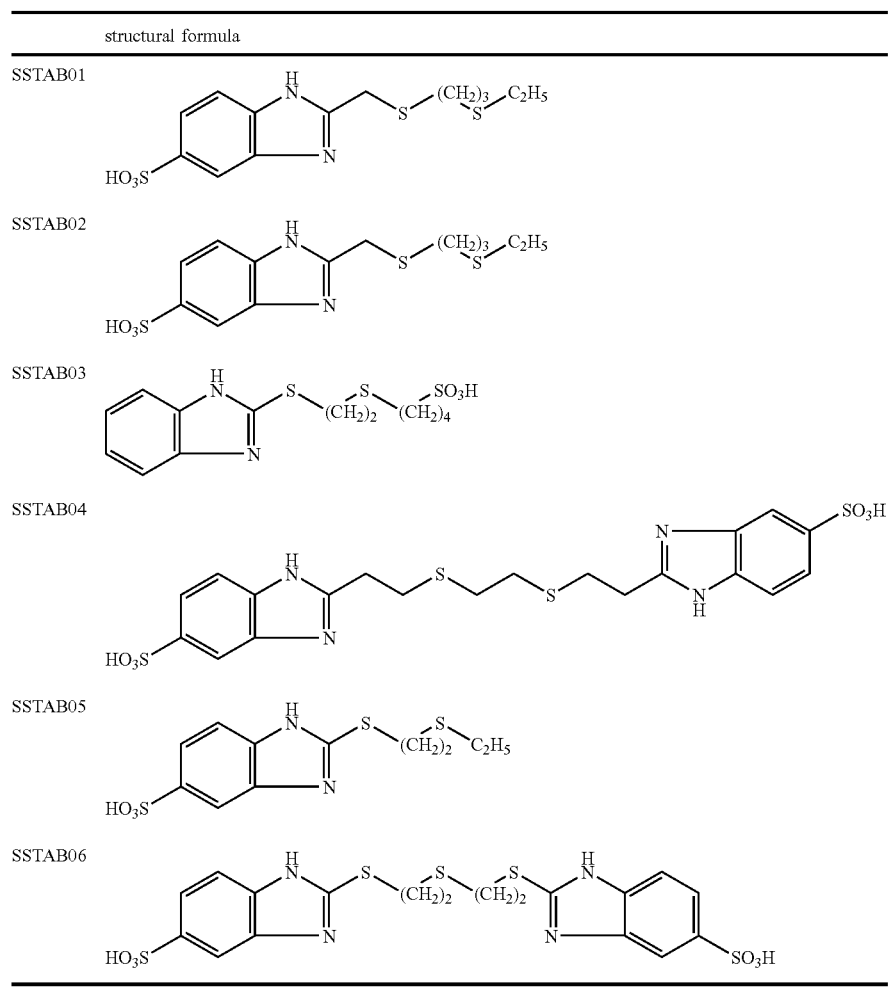

Polyanion

According to a fourteenth embodiment of the layer configuration, according to the present invention, the layer further contains a polyanion.

The polyanion compounds for use in the layer configuration, according to the present invention, are disclosed in EP-A 440 957 herein incorporated by reference and include polymeric carboxylic acids, e.g. polyacrylic acids, polymethacrylic acids, or polymaleic acids and polysulphonic acids, e.g. poly(styrene sulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to a fifteenth embodiment of the layer configuration, according to the present invention, the layer further contains a polyanion which is poly(styrene sulphonate).

Surfactants

According to a sixteenth embodiment of the layer configuration, according to the present invention, the layer further contains a non-ionic surfactant e.g. ethoxylated/fluroralkyl surfactants, polyethoxylated silicone surfactants, polysiloxane/polyether surfactants, ammonium salts of perfluro-alkylcarboxylic acids, polyethoxylated surfactants and fluorine-containing surfactants.

Suitable non-ionic surfactants include:

Surfactant no. 01=ZONYL™ FSN, a 40% by weight solution of $F(CF_2CF_2)_{1-9}CH_2CH_2O(CH_2CH_2O)_xH$ in a 50% by weight solution of isopropanol in water where x=0 to about 25, from DuPont;

Surfactant no. 02=ZONYL™ FSN-100: $F(CF_2CF_2)_{1-9}CH_2CH_2O(CH_2CH_2O)_xH$ where x=0 to about 25, from DuPont;

Surfactant no. 03=ZONYL™ FS300, a 40% by weight aqueous solution of a fluorinated surfactant, from DuPont;

Surfactant no. 04=ZONYL™ FSO, a 50% by weight solution of a mixture of ethoxylated non-ionic fluoro-surfactant with the formula: $F(CF_2CF_2)_{1-7}CH_2CH_2O(CH_2CH_2O)_yH$ where y=0 to ca. 15 in a 50% by weight solution of ethylene glycol in water, from DuPont;

Surfactant no. 05=ZONYL™ FSO-100, a mixture of ethoxylated non-ionic fluoro-surfactant from DuPont with the formula: $F(CF_2CF_2)_{1-7}CH_2CH_2O(CH_2CH_2O)_yH$ where y=0 to ca. 15 from DuPont;

Surfactant no. 06=Tegoglide™ 410, a polysiloxane-polymer copolymer surfactant, from Goldschmidt;

Surfactant no. 07=Tegowet™, a polysiloxane-polyester copolymer surfactant, from Goldschmidt;

Surfactant no. 08=FLUORAD™FC431: $CF_3(CF_2)_7SO_2$ $(C_2H_5)N$—$CH_2CO$—$(OCH_2CH_2)_nOH$ from 3M;
Surfactant no. 09=FLUORAD™FC126, a mixture of the ammonium salts of perfluorocarboxylic acids, from 3M;
Surfactant no. 10=Polyoxyethylene-10-lauryl ether
Surfactant no. 11=FLUORAD™ FC430, a 98.5% active fluoroaliphatic ester from 3M;

According to a seventeenth embodiment of the layer configuration, according to the present invention, the layer further contains an anionic surfactant.

Suitable anionic surfactants include:
Surfactant no. 12=ZONYL™ 7950, a fluorinated surfactant, from DuPont;
Surfactant no. 13=ZONYL™ FSA, 25% by weight solution of $F(CF_2CF_2)_{1-9}CH_2CH_2SCH_2CH_2COOLi$ in a 50% by weight solution of isopropanol in water, from DuPont;
Surfactant no. 14=ZONYL™ FSE, a 14% by weight solution of $[F(CF_2CF_2)_{1-7}CH_2CH_2O]_xP(O)(ONH_4)_y$ where x=1 or 2; y=2 or 1; and x+y=3 in a 70% by weight solution of ethylene glycol in water, from DuPont;
Surfactant no. 15=ZONYL™ FSJ, a 40% by weight solution of a blend of $F(CF_2CF_2)_{1-7}CH_2CH_2O]_xP(O)(ONH_4)_y$ where x=1 or 2; y=2 or 1; and x+y=3 with a hydrocarbon surfactant in a 25% by weight solution of isopropanol in water, from DuPont;
Surfactant no. 16=ZONYL™ FSP, a 35% by weight solution of $[F(CF_2CF_2)_{1-7}CH_2CH_2O]_xP(O)(ONH_4)$ where x=1 or 2; y=2 or 1 and x+y=3 in 69.2% by weight solution of isopropanol in water, from DuPont;
Surfactant no. 17=ZONYL™ UR: $[F(CF_2CF_2)_{1-7}CH_2CH_2O]_xP(O)(OH)_y$ where x=1 or 2; y=2 or 1 and x+y=3, from DuPont;
Surfactant no. 18=ZONYL™ TBS: a 33% by weight solution of $F(CF_2CF_2)_{3-8}CH_2CH_2SO_3H$ in a 4.5% by weight solution of acetic acid in water, from DuPont;
Surfactant no. 19=ammonium salt of perfluoro-octanoic acid from 3M.

Electroluminescent Phosphors

According to an eighteenth embodiment of the layer configuration, according to the present invention, the layer configuration further comprises a layer of an electroluminescent phosphor.

According to a nineteenth embodiment of the layer configuration, according to the present invention, the layer configuration further comprises a layer of an electroluminescent phosphor, wherein the electroluminescent phosphor belongs to the class of II–VI semiconductors e.g. ZnS, or is a combination of group II elements with oxidic anions, the most common being silicates, phosphates, carbonates, germanates, stannates, borates, vanadates, tungstates and oxysulphates. Typical dopants are metals and all the rare earths e.g. Cu, Ag, Mn, Eu, Sm, Tb and Ce.

According to a twentieth embodiment of the layer configuration, according to the present invention, the layer configuration further comprises a layer of an electroluminescent phosphor, wherein the electroluminescent phosphor is encapsulated with a transparent barrier layer against moisture e.g. $Al_2O_3$ and AlN. Such phosphors are available from Sylvania, Shinetsu polymer K K, Durel, Acheson and Toshiba. An example of coatings with such phosphors is 72x, available from Sylvania/GTE, and coatings disclosed in U.S. Pat. No. 4,855,189.

According to a twenty-first embodiment of the layer configuration, according to the present invention, the layer configuration further comprises a layer of an electroluminescent phosphor, wherein the electroluminescent phosphor is ZnS doped with manganese, copper or terbium, $CaGa_2S_4$ doped with cerium, electroluminescent phosphor pastes supplied by DuPont e.g.: LUXPRINT™ type 7138J, a white phosphor; LUXPRINT™ type 7151J, a green-blue phosphor; and LUXPRINT™ type 7174J, a yellow-green phosphor; and ELECTRODAG™ EL-035A supplied by Acheson.

According to a twenty-second embodiment of the layer configuration, according to the present invention, the layer configuration further comprises a layer of an electroluminescent phosphor, wherein the electroluminescent phosphor is a zinc sulphide phosphor doped with manganese and encapsulated with AlN.

Dielectric Layer

According to a twenty-third embodiment of the layer configuration, according to the present invention, the layer configuration further comprises a dielectric layer.

Any dielectric material may be used in the dielectric layer, with yttria and barium titanate being preferred e.g. the barium titanate paste LUXPRINT™ type 7153E high K dielectric insulator supplied by DuPont and the barium titanate paste ELECTRODAG™ EL-040 supplied by Acheson. A positive ion exchanger may be incorporated into the dielectric layer to capture any ions escaping from the phosphor of the light-emitting layer. The amount of ion exchanger in the dielectric layer has to be optimized so that it has a maximum effectiveness in reducing black spots while not reducing the initial brightness level. It is therefore preferred to add 0.5 to 50 parts by weight of ion exchanger to 100 parts by weight of the total amount of resin and dielectric material in the dielectric layer. The ion exchanger may be organic or inorganic.

Suitable inorganic ion exchangers are hydrated antimony pentoxide powder, titanium phosphate, salts of phosphoric acid and silicic acid and zeolite.

Support

According to a twenty-fourth embodiment of the layer configuration, according to the present invention, the support is transparent or translucent.

According to a twenty-fifth embodiment of the layer configuration, according to the present invention, the support is paper, polymer film, glass or ceramic.

According to a twenty-sixth embodiment of the layer configuration, according to the present invention, the support is a transparent or translucent polymer film.

A transparent or translucent support suitable for use with the electroconductive or antistatic layers, according to the present invention, may be rigid or flexible and consist of a glass, a glass-polymer laminate, a polymer laminate, a thermoplastic polymer or a duroplastic polymer. Examples of thin flexible supports are those made of a cellulose ester, cellulose triacetate, polypropylene, polycarbonate or polyester, with poly(ethylene terephthalate) or poly(ethylene naphthalene-1,4-dicarboxylate) being particularly preferred.

Electroluminescent Devices

According to a twenty-seventh embodiment of the layer configuration, according to the present invention, the layer configuration is an electroluminescent device.

According to a twenty-eighth embodiment of the layer configuration, according to the present invention, the layer configuration is a light emitting diode.

Thin film electroluminescent devices (ELDs) are all characterized by one (or more) electroluminescent active layer(s) sandwiched between two electrodes. Optionally a dielectric layer may also be part of the sandwich.

Thin film ELDs can be subdivided into organic and inorganic based ELDs. Organic-based thin film ELDs can be subdivided into low molecular weight organic devices including ologomers (Organic Light Emitting Diodes (OLEDs)) and high molecular weight organic devices (Polymer Light Emitting Diodes (PLEDs). The inorganic ELDs on the other hand can be further subdivided into the High Voltage Alternating Current (HV-AC) ELDs and the Low Voltage Direct Current (LV-DC) ELDs. The LV-DC ELDs include Powder ELDs (DC-PEL Devices or DC-PELDs) and thin film DC-ELDs, hereinafter called Inorganic Light Emitting Diodes (ILEDs).

The basic construction of organic ELDs (PLED and OLED) comprises following layer arrangement: a transparent substrate (glass or flexible plastic), a transparent conductor, e.g. Indium Tin Oxide (ITO), a hole transporting layer, a luminescent layer, and a second electrode, e.g. a Ca, Mg/Ag or Al/Li electrode. For OLEDs the hole transporting layer and the luminescent layer are 10–50 nm thick and applied by vacuum deposition, whereas for PLEDs the hole transporting layer is usually about 40 nm thick and the luminescent layer is usually about 100 nm thick and applied by spin coating or other non-vacuum coating techniques. A direct voltage of 5–10 V is applied between both electrodes and light emission results from holes and electrons being injected from the positive and negative electrodes respectively combining in the luminescent layer thereby producing the energy to excite the luminescent species to emit light.

In OLEDs the hole transporting layer and electroluminescent layer consist of low molecular organic compounds, N,N'-diphenyl-1,1'-biphenyl-4,4'-diamine (TPD) can, for example be used as the hole transporter and aluminium (III) 8-hydroxyquinoline complex ($Alq_3$), polyaromatics (anthracene derivatives, perylene derivatives and stilbene derivatives) and polyhetero-aromatics (oxazoles, oxadiazoles, thiazoles etc.) can be used as electroluminescent compounds.

In PLEDs electroluminescent compounds that can be used are polymers like the non-conjugated polyvinylcarbazole derivatives (PVK) or conjugated polymers like poly(p-phenylene vinylenes) (PPV), polyfluorenes, poly(3-alkylthiophene), poly(p-phenylene ethynylenes) etc. These high-molecular-weight materials allow for the easy preparation of thin films by casting, and show a high resistance to crystallization.

Low voltage DC PEL Devices generally comprise a transparent substrate, a transparent conductor (ITO), a doped ZnS phosphor layer (20 μm), and a top electrode of evaporated aluminium. The phosphor layer is applied by means of the doctor blade technique or screen printing on an ITO conducting layer. Subsequently an aluminium electrode is applied by evaporation. Upon applying a direct current voltage of several volts (ITO positive), holes start moving towards the aluminium electrode, thereby creating an insulating region (about 1 μm in thickness) next to the ITO layer within one minute or so. This results in a current drop which is associated with the onset of light emission. This process has been called the forming process. In the thin high resistive phosphor layer thereby formed, high electric fields occur and electroluminescence is already possible at low voltages (typically between 10 and 30 V). Que et al. [see Appl. Phys. Lett., volume 73, pages 2727–2729 (1998)] using ZnS:Cu nano crystals achieved turn on voltages of below 5 V.

In hybrid LEDs, inorganic emitting so-called quantum dots are used in combination with organic polymers with charge transporting properties and in some cases also emitting properties. Hybrid LEDs with CdSe nano particles have been reported by Colvin et al. [see Nature, volume 370, pages 354–357, (1994)], Dabbousi et al. [see Appl. Phys. Lett., volume 66, pages 1316–1318 (1995), and Gao et al. [see J. Phys. Chem. B, volume 102, pages 4096–4103 (1998)]; and with ZnS:Cu nano-crystals have been reported by Huang et al. [see Appl. Phys. Lett., volume 70, pages 2335–2337 (1997)] all included herein by reference.

Photovoltaic Devices

According to a twenty-ninth embodiment of the layer configuration, according to the present invention, the layer configuration is a photovoltaic device.

According to a thirtieth embodiment of the layer configuration, according to the present invention, the layer configuration is a solar cell.

According to a thirty-first embodiment of the layer configuration, according to the present invention, the layer configuration further comprises at least one photovoltaic layer. The photovoltaic layer may be an organic layer, a hybrid inorganic and organic layer or an inorganic layer.

Photovoltaic devices incorporating the layer configuration, according to the present invention, can be of two types: the regenerative type which converts light into electrical power leaving no net chemical change behind in which current-carrying electrons are transported to the anode and the external circuit and the holes are transported to the cathode where they are oxidized by the electrons from the external circuit and the photosynthetic type in which there are two redox systems one reacting with the holes at the surface of the semiconductor electrode and one reacting with the electrons entering the counter-electrode, for example, water is oxidized to oxygen at the semiconductor photoanode and reduced to hydrogen at the cathode. In the case of the regenerative type of photovoltaic cell, as exemplified by the Graetzel cell, the hole transporting medium may be a liquid electrolyte supporting a redox reaction, a gel electrolyte supporting a redox reaction, an organic hole transporting material, which may be a low molecular weight material such as 2,2',7,7'-tetrakis(N,N-di-p-methoxyphenyl-amine)9, 9'-spirobifluorene (OMeTAD) or triphenylamine compounds or a polymer such as PPV-derivatives, poly(N-vinylcarbazole) etc., or inorganic semiconductors such as CuI, CuSCN etc. The charge transporting process can be ionic as in the case of a liquid electrolyte or gel electrolyte or electronic as in the case of organic or inorganic hole transporting materials.

Such regenerative photovoltaic devices can have a variety of internal structures in conformity with the end use. Conceivable forms are roughly divided into two types: structures which receive light from both sides and those which receive light from one side. An example of the former is a structure made up of a transparently conductive layer e.g. an ITO-layer or a PEDOT/PSS-containing layer and a transparent counter electrode electrically conductive layer e.g. an ITO-layer or a PEDOT/PSS-containing layer having interposed therebetween a photosensitive layer and a charge transporting layer. Such devices preferably have their sides sealed with a polymer, an adhesive or other means to prevent deterioration or volatilization of the inside substances. The external circuit connected to the electrically-conductive substrate and the counter electrode via the respective leads is well-known.

Organic photovoltaic layers of the layer configuration, according to the present invention are, for example, mixtures of fullerene molecules (as electron acceptor and electron transporter) with conjugated polymers (e.g. substituted polyphenylenevinylene (PPV) (as light absorber and hole transporter)[see Brabec et al., Adv. Funct. Mater., volume 11(1), pages 15–26 (2001)]. In 1995 Halls et al. reported in Nature, volume 376, page 498 the successful use of acceptor-type conjugated polymers instead of fullerenes.

Alternatively the layer configuration, according to the present invention, can be incorporated in hybrid photovoltaic compositions such as described in 1991 by Graetzel et al. in Nature, volume 353, pages 737–740, in 1998 by U. Bach et al. [see Nature, volume 395, pages 583–585 (1998)] and in 2002 by W. U. Huynh et al. [see Science, volume 295, pages 2425–2427 (2002)]. In all these cases, at least one of the components (light absorber, electron transporter or hole transporter) is inorganic (e.g. nano-$TiO_2$ as electron transporter, CdSe as light absorber and electron transporter) and at least one of the components is organic (e.g. triphenylamine as hole transporter or poly(3-hexylthiophene) as hole transporter).

Inorganic photovoltaic layers which can be used in the layer configuration according to this invention are described in EP-A 1 176 646.

Transistors

According to a thirty-second embodiment of the layer configuration, according to the present invention, the layer configuration is a transistor.

According to a thirty-third embodiment of the layer configuration, according to the present invention, the layer configuration further comprises a layer with one or more of the electron transporting or hole transporting components described above, but within such a configuration that it can be used as a transistor. The semiconductor can be n-type, p-type or both (ambipolar transistor) and can be either organic or inorganic.

INDUSTRIAL APPLICATION

Layer configurations comprising a layer between a positive electrode and a material capable of hole transport and capable of reducing hole-electron recombination at the positive electrode can be used in a wide range of electronic devices such as photovoltaic devices, solar cells, batteries, capacitors, light emitting diodes, organic and inorganic electroluminescent devices, smart windows, electrochromic devices, sensors for organic and bio-organic materials and field effect transistors [see also chapter 10 of the Handbook of Oligo- and Polythiophenes, Edited by D. Fichou, Wiley-VCH, Weinheim (1999)].

The invention is illustrated hereinafter by way of comparative and invention examples. The percentages and ratios given in these examples are by weight unless otherwise indicated.

Subbing layer Nr. 01 used in the LAYER CONFIGURATIONS and LIGHT EMITTING DEVICES exemplified below has the composition:

| | |
|---|---|
| copolymer of 88% vinylidene chloride, 10% methyl acrylate and 2% itaconic acid | 79.1% |
| Kieselsol ® 100F, a colloidal silica from BAYER | 18.6% |
| Mersolat ® H, a surfactant from BAYER | 0.4% |
| Ultravon ® W, a surfactant from CIBA-GEIGY | 1.9% |

Ingredients used in the COMPARATIVE and REFERENCE LAYER CONFIGURATIONS:

Polyhydroxy-compounds:
DEG=diethylene glycol (disclosed in EP-A 686 662);
TEG=triethylene glycol (disclosed in EP-A 686 662);
DHTP=1,5-dihydroxy-3-thia-pentane;
DHDTO=1,8-dihydroxy-3,6-dithia-octane.

Preparation of PEDOT/PSS-dispersions used in Preparing the Coating Dispersions used in Preparing LAYER CONFIGURATIONS 1 to 38

Aqueous dispersion A was a 1.2% by weight of PEDOT/PSS containing a weight ratio PEDOT to PSS of 1:2.5 was prepared as disclosed in EP-A 440 957 and had a typical viscosity measured using an AR1000 plate and cone rheometer (diameter 4 cm; cone angle 2°) at 20° C. of 38 mpa.s at a shear rate of 5 $s^{-1}$ and had a pH of 1.9. Aqueous dispersion A was either used directly in the preparation of the coating dispersions or was subjected to ultrafiltration using deionized water as the washing medium in the case of aqueous dispersion B or using a 0.31% by weight solution of polyphosphoric acid as the washing medium in the case of aqueous dispersion C.

Layer Configuration 1 to 3

Coating dispersions were produced from aqueous dispersions A, B and C by adding a 30% aqueous latex of a copolymer of 88% vinylidene chloride, 10% methyl acrylate and 2% itaconic acid; 3-glycidoxypropyltrimethoxysilane, ZONYL™ FSO100 and N-methyl-pyrrolidinone to produce the following coverages for layer configurations 1, 2 and 3 respectively upon coating on a poly(ethylene terephthalate) support subbed with subbing layer 1 and then drying for 3 minutes at 45° C., whereupon the NMP largely evaporates:

| Layer configuration: | 1 & 2 | 3 |
|---|---|---|
| PEDOT: | 28.6 mg/m$^2$ | 32.0 mg/m$^2$ |
| PSS: | 71.4 mg/m$^2$ | 47.3 mg/m$^2$ |
| 88% vinylidene chloride, 10% methyl acrylate and 2% itaconic acid copolymer latex: | 100 mg/m$^2$ | 100 mg/m$^2$ |
| 3-glycidoxypropyltrimethoxysilane: | 100 mg/m$^2$ | 100 mg/m$^2$ |
| ZONYL ™ FSO 100: | 8 mg/m$^2$ | 8 mg/m$^2$ |
| polyphosphoric acid: | — | 20.7 mg/m$^2$ |
| N-methylpyrrolidinone [NMP] (theoretical): | 2 mL/m$^2$ | 2 mL/m$^2$ |

The optical density of the print and the support was determined using a MacBeth TR924 densitometer in transmission with a visible filter using 10 strips and then dividing the value obtained by 10. The results are summarized in Table 1.

The surface resistance of the coated layer was measured by contacting the coated layer with parallel copper electrodes each 35 mm long and 35 mm apart capable of forming line contacts, the electrodes being separated by a TEFLON® insulator. This enabled a direct measurement of the surface resistance to be realized. Surface resistance measurements were measured on the freshly prepared layer configurations and after subjection to 48 h and 96 h in a SUNTEST™ CPS apparatus supplied by Atlas Material Testing Technology BV, D-63558 Gelnhausen, Germany. In this test the coated support was exposed to artificial sunlight provided by a xenon lamp through a glass filter. The results are also summarized in Table 1.

LAYER CONFIGURATION 3 containing a weight ratio of polyphosphoric acid (as $H_3PO_4$) to PEDOT of 0.65:1 in which the PEDOT/PSS had been subjected to ultrafiltration with polyphosphoric acid-containing water exhibited strongly improved stability to simulated sunlight exposure compared with LAYER CONFIGURATION 2 in which the PEDOT/PSS had been subjected to ultrafiltration with water and LAYER CONFIGURATION 1 in which the PEDOT/PSS had not been subjected to ultrafiltration.

and LAYER CONFIGURATION 4 in which the PEDOT/PSS had not been subjected to ultrafiltration.

TABLE 2

| layer configuration nr | aqueous dispersion | ultra-filtration? | PPA in Washing water? | $D_{vis}/$ strip | Surface resistance [Ω/square] fresh layer | layer after 48 h SUNTEST exposure |
|---|---|---|---|---|---|---|
| 4 (comp.) | A | no | — | 0.014 | 1200 | 6000 |
| 5 (comp.) | B | yes | no | 0.014 | 1200 | 6000 |
| 6 (inv.) | C | yes | yes | 0.013 | 1100 | 2200 |

TABLE 1

| layer configuration nr | aqueous dispersion | ultra-filtration? | PPA in Washington water? | $D_{vis}/$ strip | Surface resistance [Ω/square] fresh layer | layer after 48 h SUNTEST exposure | layer after 96 h SUNTEST exposure |
|---|---|---|---|---|---|---|---|
| 1 (comp.) | A | no | — | 0.026 | 2300 | 170,000 | $3.0 \times 10^7$ |
| 2 (comp.) | B | yes | no | 0.027 | 2100 | 124,000 | $1.5 \times 10^7$ |
| 3 (inv.) | C | yes | yes | 0.028 | 1300 | 5200 | 19,500 |

Layer Configuration 4 to 6

Coating dispersions were produced from aqueous dispersions A, B and C by adding 3-glycidoxypropyltrimethoxysilane, ZONYL™ FSO100 and diethylene glycol to produce the following coverages for layer configurations 4, 5 and 6 respectively upon coating on a poly(ethylene terephthalate) support subbed with subbing layer 1 and then drying for 1 minute at 140° C.:

| Layer configuration: | 4 & 5 | 6 |
|---|---|---|
| PEDOT: | 22.8 mg/m² | 22.4 mg/m² |
| PSS: | 57.2 mg/m² | 33.1 mg/m² |
| 3-glycidoxypropyltrimethoxysilane: | 24 mg/m² | 24 mg/m² |
| ZONYL ™ FSO 100: | 11 mg/m² | 11 mg/m² |
| polyphosphoric acid: | — | 14.5 mg/m² |
| diethylene glycol [DEG] (theoretical): | 1.33 mL/m² | 1.33 mL/m² |

The surface resistance and optical density of the coated layer was measured as described for layer configurations 1 to 3. Surface resistance measurements were measured on the freshly prepared layer configurations and after subjection to 48 h in a SUNTEST™ CPS apparatus supplied by Atlas Material Testing Technology BV. In this test the coated support was exposed to artificial sunlight provided by a xenon lamp through a glass filter. The results are summarized in Table 2.

LAYER CONFIGURATION 6 containing a weight ratio of polyphosphoric acid (as $H_3PO_4$) to PEDOT of 0.65:1 in which the PEDOT/PSS had been subjected to ultrafiltration with polyphosphoric acid-containing water exhibited strongly improved stability to simulated sunlight exposure compared with LAYER CONFIGURATION 5 in which the PEDOT/PSS had been subjected to ultrafiltration with water Layer Configuration 7 to 9

Coating dispersions were produced from aqueous dispersion A by adding 3-glycidoxypropyltrimethoxysilane, ZONYL™ FSO100, diethylene glycol and optionally polyphosphoric acid to produce the following coverages for layer configurations 7, 8 and 9 respectively upon coating on a poly(ethylene terephthalate) support subbed with subbing layer 1 and then drying for 1 minute at 140° C., whereupon the diethylene glycol at least partly evaporates:

| layer configuration nr. | 7 (comp.) | 8 (inv.) | 9 (inv.) |
|---|---|---|---|
| PEDOT/PSS [mg/m²] | 70 | 70 | 70 |
| 3-glycidoxypropyltrimethoxysilane [mg/m²] | 24 | 24 | 24 |
| ZONYL ™ FSO 100 [mg/m²] | 11 | 11 | 11 |
| polyphosphoric acid [mg/m²] | — | 70 | 140 |
| diethylene glycol [mg/mL] (theoretical) | 1.3 | 1.3 | 1.3 |

The surface resistance of the coated layer was measured as described for layer configurations 1 to 3. Surface resistance measurements were measured on the freshly prepared layer configurations and after subjection to 48 h in a SUNTEST™ CPS apparatus supplied by Atlas Material Testing Technology BV. In this test the coated support was exposed to artificial sunlight provided by a xenon lamp through a glass filter. The results are summarized in Table 3.

LAYER CONFIGURATIONS 8 and 9 in which the PEDOT/PSS-layer contains a weight ratio of polyphosphoric acid (as $H_3PO_4$) to PEDOT of 3.46:1 and 6.92:1 respectively exhibited strongly improved stability to simulated sunlight exposure compared with LAYER CONFIGURATION 7 without polyphosphoric acid.

TABLE 3

| layer configuration nr | aqueous dispersion | ultra-filtration? | coverage PPA in [mg/m²] | Surface resistance [Ω/square] | |
|---|---|---|---|---|---|
| | | | | fresh layer | layer after 48 h SUNTEST exposure |
| 7 (comp.) | A | no | — | 1400 | 11,200 |
| 8 (inv.) | A | no | 70 | 1400 | 2800 |
| 9 (inv.) | A | no | 140 | 1400 | 4200 |

Layer Configuration 10 to 19

LAYER CONFIGURATION 10 was prepared as described for LAYER CONFIGURATION 1 and LAYER CONFIGURATIONS 11 to 19 were prepared as described for LAYER CONFIGURATION 2 except that the compounds specified in Table 4 were incorporated into the PEDOT/PSS-containing layer at a coverage of 10 mg/m².

The surface resistance and optical density of the PEDOT/PSS-containing layer was measured as described for layer configurations 1 to 3. Surface resistance measurements were measured on the freshly prepared layer configurations and after subjection to 48 h and 96h in a SUNTEST™ CPS apparatus supplied by Atlas Material Testing Technology BV. In this test the coated support was exposed to artificial sunlight provided by a xenon lamp through a glass filter. The results are summarized in Table 4.

The results in Table 4 show that at a coverage of 10 mg/m² incorporation of polyhydroxy-compounds according to formula (I) or formula (II) into PEDOT/PSS-containing layers resulted in an improvement in stability to exposure to simulated sunlight in a SUNTEST apparatus over that found for PEDOT/PSS-containing layers without an additive (LAYER CONFIGURATION 10), those to which two polyhydroxy-compounds disclosed in EP-A 686 662, diethylene glycol and triethylene glycol, had been added (LAYER CONFIGURATIONS 11 and 12) and those to which the thia-analogue compounds of diethylene glycol (DHTP) and triethylene glycol (DHDTO) had been added (LAYER CONFIGURATIONS 13 and 14).

TABLE 4

| layer configuration nr | compound type | Surface resistance [Ω/square] | | |
|---|---|---|---|---|
| | | fresh layer | layer after 48 h SUNTEST exposure | layer after 96 h SUNTEST exposure |
| 10 (comp.) | — | 3246 | 129.840 (40*) | 4.24 × 10⁶ (1307*) |
| 11 (comp.) | DEG | 2890 | 75,140 (26*) | 3.10 × 10⁶ (1072*) |
| 12 (comp.) | TEG | 3043 | 85,204 (28*) | 2.52 × 10⁶ (827*) |
| 13 (comp.) | DHTP | 3396 | 217,344 (64*) | 8.77 × 10⁶ (2583*) |
| 14 (comp.) | DHDTO | 3147 | 138,468 (44*) | 12.19 × 10⁶ (3872*) |
| 16 (inv.) | PHC01 | 3293 | 36,223 (11*) | 253,561 (77*) |
| 17 (inv.) | PHC02 | 2987 | 47,732 (16*) | 609,348 (204*) |
| 18 (inv.) | PHC03 | 3170 | 50,720 (16*) | 494,520 (156*) |
| 19 (inv.) | PHC11 | 3006 | 69,138 (23*) | 1.58 × 10⁶ (524*) |

*ratio of surface resistance to surface resistance of fresh layer

Layer Configuration 20 to 22

LAYER CONFIGURATIONS 20 to 22 were prepared as described for LAYER CONFIGURATION 1 except that the compounds specified in Table 5 was incorporated into the PEDOT/PSS-containing layer at a coverage of 10 mg/m² or 50 mg/m².

The surface resistance and optical density of the PEDOT/PSS-containing layer was measured as described for layer configurations 1 to 3. Surface resistance measurements were measured on the freshly prepared layer configurations and after subjection to 48 h and 96 h in a SUNTEST™ CPS apparatus supplied by Atlas Material Testing Technology BV. In this test the coated support was exposed to artificial sunlight provided by a xenon lamp through a glass filter. The results are summarized in Table 5 together with those for LAYER CONFIGURATION 10 in which no additive has been added to the PEDOT/PSS-containing layer as a COMPARATIVE EXAMPLE.

The results in Table 5 show that at a coverage of 10 mg/m² incorporation of a thia-alkanedicarboxylic acid into PEDOT/PSS-containing layers resulted in an improvement in stability to exposure to simulated sunlight in a SUNTEST apparatus over that found for PEDOT/PSS-containing layers without an additive (LAYER CONFIGURATION 10). Excellent stability was observed for a coverage of 50 mg/m² of TADCA01 in PEDOT/PSS-layers after 48 h and 96 h exposure to simulated sunlight in a SUNTEST apparatus.

TABLE 5

| layer configuration nr | compound type | coverage [mg/m²] | Surface resistance [Ω/square] | |
|---|---|---|---|---|
| | | | fresh layer | layer after 48 h SUNTEST exposure | layer after 96 h SUNTEST exposure |
| 10 (comp.) | — | — | 3246 | 129,840 (40*) | 4.24 × 10⁶ (1307*) |
| 20 (inv.) | TADCA01 | 10 | 2300 | 34,500 (15*) | 687,700 (299*) |
| 21 (inv.) | TADCA01 | 50 | 2428 | 16,600 (7*) | 170,000 (70*) |
| 22 (inv.) | TADCA02 | 10 | 3320 | 119,520 (36*) | 162,680 (49*) |

*ratio of surface resistance to surface resistance of fresh layer

Layer Configuration 23 to 25

LAYER CONFIGURATIONS 23 to 25 were prepared as described for LAYER CONFIGURATION 1 except that the compounds specified in Table 6 was incorporated into the PEDOT/PSS-containing layer at a coverage of 10 mg/m$^2$.

The surface resistance and optical density of the PEDOT/PSS-containing layer was measured as described for layer configurations 1 to 3. Surface resistance measurements were measured on the freshly prepared layer configurations and after subjection to 48 h and 96h in a SUNTEST™ CPS apparatus supplied by Atlas Material Testing Technology BV. In this test the coated support was exposed to artificial sunlight provided by a xenon lamp through a glass filter. The results are summarized in Table 6 together with those for LAYER CONFIGURATION 10 in which no additive has been added to the PEDOT/PSS-containing layer as a COMPARATIVE EXAMPLE.

TABLE 6

| layer | compound | | Surface resistance [Ω/square] | | |
|---|---|---|---|---|---|
| configuration nr | compound type | coverage [mg/m$^2$] | fresh layer | layer after 48 h SUNTEST exposure | layer after 96 h SUNTEST exposure |
| 10 (comp.) | — | — | 3246 | 129,840 (40*) | 4.24 × 10$^6$ (1307*) |
| 23 (inv.) | TAD01 | 10 | 3100 | 86,800 (28*) | 1.25 × 10$^6$ (403*) |
| 24 (inv.) | TAD01 | 100 | 2313 | 8,470 (4*) | 44,000 (19*) |
| 25 (inv.) | TAD02 | 10 | 3000 | 63,000 (21*) | 1.17 × 10$^6$ (389*) |

*ratio of surface resistance to surface resistance of fresh layer

The results in Table 6 show that at a coverage of 10 mg/m$^2$ incorporation of a tetronic acid derivative into PEDOT/PSS-containing layers resulted in an improvement in stability to exposure to simulated sunlight in a SUNTEST apparatus over that found for PEDOT/PSS-containing layers without an additive (LAYER CONFIGURATION 10). Excellent stability was observed for a coverage of 100 mg/m$^2$ of ascorbic acid in PEDOT/PSS-layers after 48 h and 96 h exposure to simulated sunlight in a SUNTEST apparatus.

Layer Configuration 26

LAYER CONFIGURATION 26 was prepared as described for LAYER CONFIGURATION 1 except that the compound specified in Table 7 was incorporated into the PEDOT/PSS-containing layer at a coverage of 10 mg/m$^2$.

The surface resistance and optical density of the PEDOT/PSS-containing layer was measured as described for layer configurations 1 to 3. Surface resistance measurements were measured on the freshly prepared layer configurations and after subjection to 48 h and 96 h in a SUNTEST™ CPS apparatus supplied by Atlas Material Testing Technology BV. In this test the coated support was exposed to artificial sunlight provided by a xenon lamp through a glass filter. The results are summarized in Table 7 together with those for LAYER CONFIGURATION 10 in which no additive has been added to the PEDOT/PSS-containing layer as a COMPARATIVE EXAMPLE.

TABLE 7

| layer | compound | | Surface resistance [Ω/square] | | |
|---|---|---|---|---|---|
| configuration nr | compound type | coverage [mg/m$^2$] | fresh layer | layer after 48 h SUNTEST exposure | layer after 96 h SUNTEST exposure |
| 10 (comp.) | — | — | 3246 | 129,840 (40*) | 4.24 × 10$^6$ (1307*) |
| 26 (inv.) | CHDC01 | 10 | 3113 | 23,000 (7*) | 184,000 (59*) |

*ratio of surface resistance to surface resistance of fresh layer

The results in Table 7 show that incorporation of CHDC01 into PEDOT/PSS-containing layers at a coverage of 10 mg/m$^2$ resulted in an improvement in stability to exposure to simulated sunlight in a SUNTEST apparatus over that found for PEDOT/PSS-containing layers without an additive (LAYER CONFIGURATION 10).

Layer Configuration 27 to 33

LAYER CONFIGURATION 27 was prepared as described for LAYER CONFIGURATION 4 and LAYER CONFIGURATIONS 28 to 33 were prepared as described for LAYER CONFIGURATION 4 except that the compounds specified in Table 7 were incorporated into the PEDOT/PSS-containing layer at a coverage of 10 mg/m$^2$.

The surface resistance and optical density of the PEDOT/PSS-containing layers was measured as described for layer configurations 1 to 3. Surface resistance measurements were measured on the freshly prepared layer configurations and after subjection to 48 h and 96 h in a SUNTEST™ CPS apparatus supplied by Atlas Material Testing Technology BV. In this test the coated support was exposed to artificial sunlight provided by a xenon lamp through a glass filter. The results are summarized in Table 8.

TABLE 8

| layer configuration nr | compound type | Surface resistance [Ω/square] | | |
|---|---|---|---|---|
| | | fresh layer | layer after 48 h SUNTEST exposure | layer after 96 h SUNTEST exposure |
| 27 (comp.) | — | 1859 | 16,731 (9*) | 455,455 (245*) |
| 28 (inv.) | PHC01 | 1634 | 13,072 (8*) | 321,898 (197*) |
| 29 (inv.) | PHC02 | 1300 | 6,500 (5*) | — |
| 30 (inv.) | PHC03 | 1300 | 6,500 (5*) | — |
| 31 (inv.) | PHC11 | 1900 | 9,500 (5*) | — |
| 32 (inv.) | TADCA01 | 1749 | 15,741 (9*) | 173,151 (99*) |
| 33 (inv.) | TADCA02 | 1300 | 7,800 (6*) | — |

*ratio of surface resistance to surface resistance of fresh layer

The results in Table 8 show that at a coverage of 10 mg/m$^2$ incorporation of polyhydroxy-compounds according to formula (I), polyhydroxy-compounds according to formula (II) and thia-alkanedicarboxylic acids into PEDOT/PSS-containing layers resulted in an improvement in stability to exposure to simulated sunlight in a SUNTEST apparatus over that found for PEDOT/PSS-containing layers without an additive (LAYER CONFIGURATION 27).

Layer Configuration 34 to 38

LAYER CONFIGURATIONS 34 to 38 were prepared as described for LAYER CONFIGURATION 4 except that the compounds specified in Table 9 were incorporated into the PEDOT/PSS-containing layer at the coverages specified in Table 9.

The surface resistance and optical density of the PEDOT/PSS-containing layer was measured as described for layer configurations 1 to 3. Surface resistance measurements were measured on the freshly prepared layer configurations and after subjection to 48 h and 96h in a SUNTEST™ CPS apparatus supplied by Atlas Material Testing Technology BV. In this test the coated support was exposed to artificial sunlight provided by a xenon lamp through a glass filter. The results are summarized in Table 9.

TABLE 9

| layer configuration nr | compound type | coverage [mg/m$^2$] | Surface resistance [Ω/square] | |
|---|---|---|---|---|
| | | | fresh layer | layer after 48 h SUNTEST exposure |
| 27 (comp.) | — | — | 1859 | 16,731 (9*) |
| 34 (inv.) | TAD01 | 10 | 1623 | 21,099 (13*) |
| 35 (inv.) | TAD02 | 10 | 1300 | 6,500 (5*) |
| 36 (inv.) | TAD02 | 50 | 1500 | 4,500 (3*) |
| 37 (inv.) | TAD03 | 10 | 1200 | 4,800 (4*) |
| 38 (inv.) | TAD03 | 50 | 1200 | 3,600 (3*) |

*ratio of surface resistance to surface resistance of fresh layer

The results in Table 9 show that at a coverage of 10 mg/m$^2$ incorporation of all the tetronic acid derivatives into PEDOT/PSS-containing layers resulted in a substantial improvement in stability to exposure to simulated sunlight in a SUNTEST apparatus over 48 h over that found for PEDOT/PSS-containing layers without an additive (LAYER CONFIGURATION 27). At a coverage of 50 mg/m in PEDOT/PSS-containing layers, TAD02 and TAD03 brought about a substantial improvement in stability to exposure to simulated sunlight in a SUNTEST apparatus over 48 h over that found for PEDOT/PSS-containing layers without an additive (LAYER CONFIGURATION 27).

Layer Configuration 39 and 40

LAYER CONFIGURATIONS 39 and 40 were prepared as described for LAYER CONFIGURATION 4 except that the compounds specified in Table 10 were incorporated into the PEDOT/PSS-containing layer at the coverages specified in Table 10.

The surface resistance and optical density of the PEDOT/PSS-containing layer was measured as described for layer configurations 1 to 3. Surface resistance measurements were measured on the freshly prepared layer configurations and after subjection to 48 h and 96 h in a SUNTEST™ CPS apparatus supplied by Atlas Material Testing Technology BV. In this test the coated support was exposed to artificial sunlight provided by a xenon lamp through a glass filter. The results are summarized in Table 10.

The results in Table 10 show that at a coverage of 10 mg/m$^2$ incorporation of the ortho-dihydroxy-benzene compound ODHB01 and the sulpho-substituted 2-thia-alkyl-benzimidazole compound SSTAB01, into PEDOT/PSS-containing layers resulted in an improvement in stability to exposure to simulated sunlight in a SUNTEST apparatus over 48 h over that found for PEDOT/PSS-containing layers without an additive (LAYER CONFIGURATION 27).

TABLE 10

| layer configuration nr | compound type | coverage [mg/m$^2$] | Surface resistance [Ω/square] | |
|---|---|---|---|---|
| | | | fresh layer | layer after 48 h SUNTEST exposure |
| 27 (comp.) | — | — | 1859 | 16,731 (9*) |
| 39 (inv.) | OHDB01 | 10 | 1600 | 4,800 (3*) |
| 40 (inv.) | SSTAB01 | 10 | 1647 | 13,176 (8*) |

*ratio of surface resistance to surface resistance of fresh layer

LIGHT EMITTING DEVICE EXAMPLES

Synthesis of Pedot-S

Synthesis of 2-acetoxymethyl-2,3-dihydro-thieno[3,4-b][1,4]dioxine-5,7-dicarboxylic acid dimethyl ester

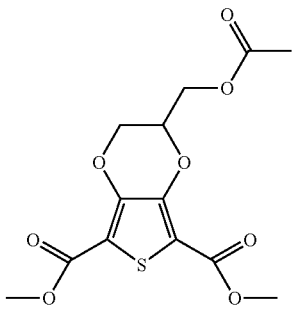

A 70/30 molar mixture of 2-acetoxymethyl-2,3-dihydro-thieno[3,4-b][1,4]dioxine-5, 7-dicarboxylic acid dimethyl ester and 3-acetoxy-3,4-dihydro-2H-thieno[3,4-b][1,4]dioxepine-6, 8-dicarboxylic acid dimethyl ester was obtained by performing the reaction between 3,4-dihydroxythiophene-2,5-dicarboxylic acid dimethyl ester and epibromohydrin as described in U.S. Pat. No. 5,111,327. This mixture was subsequently separated by an acetylation/selective crystallization procedure: the 70/30 molar mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester (143 g, 0.496 mol) was dissolved in methylene chloride (1.5 l). Triethylamine (80 mL) was subsequently added after which acetyl chloride (43 mL) was added dropwise, constantly keeping the reaction around 25° C. by slight cooling. After addition the mixture was stirred for another hour at 25° C.

Subsequently, the reaction mixture was washed several times with aqueous HCl (1M), aqueous NaHCO3 (1M) and saturated aqueous NaCl, respectively. The solvent was removed and the resulting solid was recrystallized from ethanol. After filtration and washing of the residue, pure 2-acetoxymethyl-2,3-dihydro-thieno[3,4-b][1,4]dioxine-5,7-dicarboxylic acid dimethyl ester was obtained as demonstrated by NMR and mass spectroscopy.

Synthesis of 2-hydroxymethyl-2,3-dihydro-thieno[3,4-b][1,4]dioxine-5,7-dicarboxylic acid

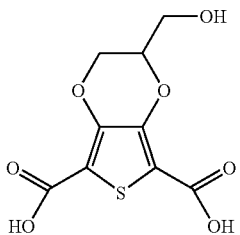

2-Acetoxymethyl-2,3-dihydro-thieno[3,4-b][1,4]dioxine-5,7-dicarboxylic acid dimethyl ester (60 g, 0.18 mol) was dissolved in ethanol (680 mL). KOH (36 g) was added to this solution after which water (500 mL) was added upon continuous cooling. After addition of the water the reaction mixture was stirred for another 30 minutes after which the solvents were removed by distillation. To the remaining part of the reaction mixture, we dropwise added a mixture of ice (50 g) and concentrated HCl (25 mL), and stirred. The mixture was then filtered and the residue was washed with water. Subsequent drying resulted in quantitative formation of pure 2-hydroxymethyl-2,3-dihydro-thieno[3,4-b][1,4]dioxine-5,7-dicarboxylic acid as demonstrated by NMR and mass spectroscopy.

Synthesis of (2,3-dihydro-thieno(3,4-b][1,4]dioxin-2-yl)-methanol

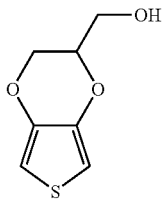

2-Hydroxymethyl-2,3-dihydro-thieno[3,4-b][1,4]dioxine-5,7-dicarboxylic acid (48 g, 0.184 mol) was dissolved in N,N-dimethylacetamide (500 mL), and Cu$_2$Cr$_2$O$_7$ (8.6 g) and quinoline (15 drops) were added. This mixture was subsequently stirred for 2 hours at 150° C., after which it was cooled to 25° C. It was then poured into ethyl acetate, the catalyst was removed by filtration and the filtrate was washed with acidic water and aqueous, saturated NaCl. Subsequently, the solvent was removed after which pure (2,3-dihydro-thieno[3,4-b][1,4]dioxin-2-yl)-methanol was isolated by vacuum distillation (115–120° C.; 0.05 mm Hg).

Synthesis of 4-(2,3-dihydro-thieno[3,4-b][1,4]dioxin-2-yl-methoxy)-butane-1-sulphonic acid sodium salt

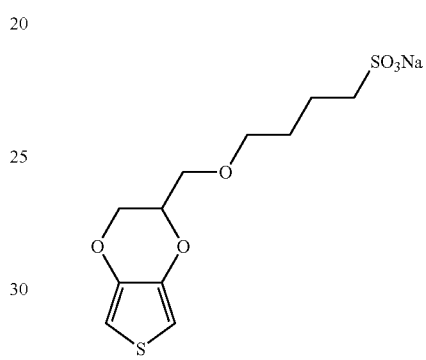

(2,3-Dihydro-thieno[3,4-b][1,4]dioxin-2-yl)-methanol (6.9 g, 40 mmol) was dissolved into tetrahydrofuran (100 mL) and blanketed by N2. NaH (1.76 g) was added and stirring was continued for 30 min. Then butanesultone (6.0 g) was added dropwise after which the reaction mixture was brought to reflux for 3 h. Then it was cooled to 25° C. again, the solvent was removed, methanol was added, the mixture was stirred, filtered and the filtrate was concentrated. The remaining oil was solidified by addition of hexane and ethanol, followed by stirring. Final filtration and drying resulted in pure 4-(2,3-dihydro-thieno[3,4-b][1,4]dioxin-2-ylmethoxy)-butane-1-sulphonic acid sodium salt as was demonstrated by NMR and mass spectroscopy.

Chemical Polymerization of 4-(2,3-dihydro-thieno[3,4-b][1,4]-dioxin-2-ylmethoxy)-butane-1-sulphonic acid sodium salt 4-(2,3-Dihydro-thieno[3,4-b][1,4]dioxin-2-ylmethoxy)-butane-1-sulphonic acid sodium salt (0.66 g, 2.0 mmol) was dissolved in oxygen-free water (20 mL). The solution was heated to 80° C. after which Fe(OTs)$_3$.6H$_2$O (4.06 g, 6.0 mmol) was added. The colour of the solution immediately turned dark blue. The reaction mixture was kept at 80° C. for 3.5 h more, after which it was cooled and filtered. The filtrate was finally freed of iron, sodium and tosylate ions by ion exchange with cationic and anionic resins resulting in a dark blue aqueous PEDOT-S solution. The solution was finally diluted with deionized water to 1% by weight PEDOT-S.

Layer Configuration 1 to 10

Preparation of the Electroluminescent ZnS:Cu Dispersion

The following solutions were prepared:

| | | |
|---|---|---|
| Solution 1 | zinc acetate dihydrate | 131.7 g |
| | copper acetate monohydrate | 0.54 g |
| | deionized water | to 600 mL |
| Solution 2 | sodium sulphide nonahydrate | 113.6 g |
| | ammonia (50%) | 5 mL |
| | deionized water | to 600 mL |
| Solution 3 | TRI* | 40 g |
| | deionized water | to 1000 mL |
| | sodium chloride | 58.44 g |

*TRI = (5-methyl-1,2,4-triazolo-(1,5-a)-pyrimidine-7-ol)

Solutions 1 and 2 at room temperature were added simultaneously both at a flow rate of 500 ml/min to solution 3, held at room temperature and stirred at 1500 rpm. To 1000 ml of the resulting dispersion, 1000 ml of a 1% polyphosphoric acid solution adjusted to pH 6 with ammonium hydroxide was added and the dispersion was concentrated to 1000 ml by means ultrafiltration using a Fresenius F60 cartridge. This dispersion was subsequently diafiltered by using 5500 ml of a 1% solution of polyphosphoric acid solution adjusted to pH 6 with ammonium hydroxide solution in water. The dispersion was further concentrated to a volume of about 570 ml to produce an aqueous dispersion at pH 6 containing 30 g/L ZnS:Cu and 1% polyphosphoric acid. The dispersion was then ball-milled for 1 hour. 20 ml of the resulting dispersion was then ultrasonically treated with a ultrasound bar (Vibra cell VCX 400 W from Sonics & Materials Inc.—amplitude about 78%—output 40%) for 3 minutes while cooling in ice. 3.2 g of a 5% by weight aqueous solution of poly(vinylpyrrolidone) in water was then added to 16.8 g of the ZnS:Cu dispersion followed by further ultrasonic treatment with the ultrasound bar for 5 minutes. 0.5 ml of ZONYL™ FSO100 was then added as a 1% by weight aqueous solution followed by thorough stirring. The resulting dispersion was then filtered through a 5 μm MILLIPORE™ filter, a nano-dispersion of electroluminescent ZnS:Cu being thereby produced.

Preparation of the Patterned ITO Electrode

An indium tin oxide [ITO] layer on 175 μm thick poly(ethylene terephthalate) [PET] from IST, with a surface resistance of about 80 Ohm/square, was used as the hole-conducting electrode. ITO/PET sheets of 5×5 cm were taped off in the middle of the plate with a 2 cm Magic tape Scotch 810 from 3M. The sides of the ITO plates were etched with a solution consisting of 50 mL of concentrated hydrochloric acid, 50 mL of deionized water and 4 mL of concentrated nitric acid. After the etching, the ITO/PET sheets were rinsed with water several times and subsequently dried with a hair dryer. After drying, the tape was removed and the sheets were put into a vessel with iso-propanol which was put into an ultrasound bath for 10 minutes. Afterwards they were dried at 50° C. for 10 minutes. Each ITO/PET sheet contained a band of 2 cm of conductive ITO in the middle.

Preparation and Application of Electron Blocking Layer

The Solutions/Dispersions Given in Table 11 were Prepared.

TABLE 11

| solution nr | 6% aqueous solution of polyphosphoric acid (PPA) [mL] | 1% PEDOT-S in H$_2$O at pH = 2.1 [g] | 5% ZONYL ™ FSO 100 in H$_2$O [mL] | deionized water [mL] |
|---|---|---|---|---|
| 4 | — | 3.0 | 2.0 | — |
| 5 | 2.0 | — | 2.0 | 16.0 |
| 6 | 2.0 | 0.6 | 2.0 | 15.4 |
| 7 | 1.0 | 6.0 | 2.0 | 11.0 |
| 8 | — | 2.0 | 0.2 | — |
| 9 | 4.1 | — | 2.0 | 13.9 |
| 10 | 2.0 | 0.6 | 1.0 | 6.4 |
| 11 | 1.7 | 2.0 | 1.0 | 5.3 |
| 12 | 0.5 | 3.1 | 1.0 | 0.2 |

Solutions 4, 5, 6 and 7 were spincoated on patterned ITO/PET sheets at 800 rpm for 6 s and then 4000 rpm for 50 s and the layers dried at 40° C. for 10 minutes. This resulted in a layer thickness of about 5 to 10 nm thereby producing the substrates for Devices 2, 3, 4 and 5 respectively.

Solutions 8, 9, 10, 11 and 12 were spincoated on patterned ITO/PET at 800 rpm for 6 s and then 1500 rpm for 50 s and the layers dried at 40° C. for 10 minutes. This resulted in a layer thickness of about 100 nm. The substrates for Devices 6, 7, 8, 9 and 10 respectively were thereby produced.

The thicknesses were measured with a DEKTAK™ profilometer with the layer spincoated on glass. Similar layer thicknesses can be expected on ITO/PET.

Application of the Electroluminescent Layer

On top of the patterned ITO/PET without an electron blocking layer, the electroluminescent nano ZnS:Cu-dispersion was spincoated for 6 seconds at 1000 rpm followed by 50 seconds at 2000 rpm. The electroluminescent nano ZnS:Cu-dispersion was applied to the substrates of devices 2 to 25 in the same way on top of the particular blocking layer used.

The resulting layers were then dried at 50° C. for 10 minutes, a electroluminescent ZnS:Cu-layer thickness of 100 nm being thereby obtained.

Application of the Aluminium Electrode

Subsequently, a 160 nm thick aluminium electrode (cathode) was vacuum deposited on the spincoated double layers at a vacuum of $1.33\times10^{-4}$ N m$^{-2}$ Pa using a mask. The emission area was 25 mm$^2$. The device construction is shown in FIG. 1.

Performance of the Light Emitting Devices

The results for light emitting devices 2 to 10 are given in Table 12 together with the results for device 1 prepared at the same time but without a layer between the patterned ITO-layer and the electroluminescent layer.

TABLE 12

| Device nr. | layer | Thickness of layer [nm] | Lifetime [sec] | Optimum voltage [V] |
|---|---|---|---|---|
| 1 (ref.) | No | — | 650 | 6.2 |
| 2 (ref.) | PEDOT-S | 5 | 840 | 6.6 |
| 3 (ref.) | PPA | 5 | 580 | 6.1 |
| 4 (inv.) | PEDOT-S/PPA (5/100) | 5 | 1050 | 6.3 |
| 5 (ref.) | PEDOT-S/PPA (50/50) | 5 | 1040 | 6.2 |
| 6 (ref.) | PEDOT-S | 100 | 380 | 7.8 |
| 7 (ref.) | PPA | 100 | 480 | 6.3 |
| 8 (inv.) | PEDOT-S/PPA (5/100) | 100 | 1160 | 6.2 |
| 9 (inv.) | PEDOT-S/PPA (20/100) | 100 | 720 | 6.8 |
| 10 (inv.) | PEDOT-S/PPA (50/50) | 100 | 710 | 7.7 |

At a forward bias, the devices exhibited electroluminescence with a $\lambda_{max}$ of 490 nm. For the lifetime measurements, a forward bias was applied and the voltage was increased so as to keep the light output constant at ca. 0.5 Cd/m². The maximum voltage was 12 V. The lifetime of the light emitting device was taken to be the time between application of the optimum voltage and the moment no further electroluminescence could be observed. The optimum voltage was that voltage at which maximum light output was observed.

It can be concluded from Table 12 that for a polyphosphoric acid (PPA), with surfaces contiguous with an anode on one side of the layer and a material capable of transporting holes on the opposite side, the incorporation therein of a polymer according to formula I, such as PEDOT-S, in PEDOT-S/PPA weight ratios of 5:100, 20:100 and 50:50 results in an improvement in lifetime over that obtained with no layer and with PEDOT-S and PPA layers.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practised otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A layer configuration on a support, said layer configuration comprising a layer containing a polymer containing optionally substituted 3,4-alkylenedioxythiophene structural units, in which said two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

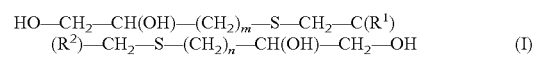

wherein $R^1$ and $R^2$ are independently H, —OH or alkyl, and n and m are independently 1, 2 or 3; compounds according to formula (II):

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

2. Layer configuration according to claim 1, wherein said optionally substituted 3,4-alkylenedioxythiophene structural units are represented by formula (III):

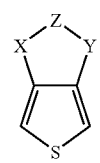

in which X and Y are O, Z is —$(CH_2)_m$—$CR^3R^4$—$(CH_2)_n$—; $R^3$ is hydrogen or —$(CH_2)_s$—O—$(CH_2)_p$—$SO_3^-M^+$; $R^4$ is —$(CH_2)_5$—O—$(CH_2)_p$—$SO_3^-M^+$; $M^+$ is a cation; m and n are independently a whole number from 0 to 3; s is a whole number from 0 to 10; and p is a whole number from 1 to 18.

3. Layer configuration according to claim 1, wherein said polymer containing optionally substituted 3,4-alkylenedioxythiophene structural units is a polythiophene according to formula (IV)

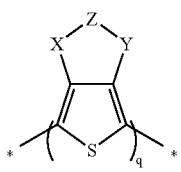

(IV)

in which X and Y are O; Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18; and q is a whole number from 2 to 10,000.

4. Layer configuration according to claim 1, wherein said polymer containing optionally substituted 3,4-alkylenedioxythiophene structural units is poly[4-(2,3-dihydro-thieno[3,4-b][1,4]dioxin-2-ylmethoxy)-butane-1-sulphonic acid].

5. Layer configuration according to claim 1, wherein said polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

6. Layer configuration according to claim 1, wherein said polymer containing optionally substituted 3,4-alkylenedioxythiophene structural units is poly(3,4-ethylenedioxythiophene).

7. Layer configuration according to claim 1, wherein said layer further contains a polyanion.

8. Layer configuration according to claim 7, wherein said polyanion is poly(styrene sulphonate).

9. A light emitting diode consisting of a layer configuration on a support, said layer configuration comprising a layer containing a polymer containing optionally substituted 3,4-alkylenedioxythiophene structural units, in which said two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

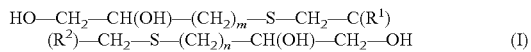

(I)

wherein R$^1$ and R$^2$ are independently H, —OH or alkyl, and n and m are independently 1, 2 or 3; compounds according to formula (II):

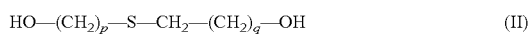

(II)

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

10. Light emitting diode according to claim 9, wherein said optionally substituted 3,4-alkylenedioxythiophene structural units are represented by formula (III):

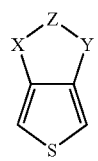

(III)

in which X and Y are O, Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18.

11. Light emitting diode according to claim 9, wherein said polymer containing optionally substituted 3,4-alkylenedioxythiophene structural units is a polythiophene according to formula (IV)

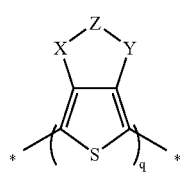

(IV)

in which X and Y are O; Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18; and q is a whole number from 2 to 10,000.

12. Light emitting diode according to claim 9, wherein said polymer containing optionally substituted 3,4-alkylenedioxythiophene structural units is poly[4-(2,3-dihydrothieno[3,4-b][1,4]dioxin-2-ylmethoxy)-butane-1-sulphonic acid].

13. Light emitting diode according to claim 9, wherein said polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

14. Light emitting diode according to claim 9, wherein said polymer containing optionally substituted 3,4-alkylenedioxythiophene structural units is poly(3,4-ethylenedioxythiophene).

15. Light emitting diode according to claim 9, wherein said layer further contains a polyanion.

16. Light emitting diode according to claim 15, wherein said polyanion is poly(styrene sulphonate).

17. A photovoltaic device consisting of a layer configuration on a support, said layer configuration comprising a layer containing a polymer containing optionally substituted 3,4-alkylenedioxythiophene structural units, in which said two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

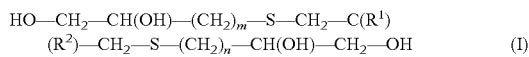
(I)

wherein $R^1$ and $R^2$ are independently H, —OH or alkyl, and n and m are independently 1, 2 or 3; compounds according to formula (II):

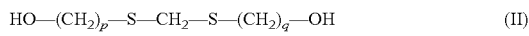
(II)

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

18. Photovoltaic device according to claim 17, wherein said optionally substituted 3,4-alkylenedioxythiophene structural units are represented by formula (III):

(III)

in which X and Y are O, Z is —$(CH_2)_m$—$CR^3R^4(CH_2)_n$—; $R^3$ is hydrogen or —$(CH_2)_s$—O—$(CH_2)_p$—$SO_3^-M^+$; $R^4$ is —$(CH_2)_s$—O—$(CH_2)_p$—$SO_3^-M^+$; $M^{31}$ is a cation; m and n are independently a whole number from 0 to 3; s is a whole number from 0 to 10; and p is a whole number from 1 to 18.

19. Photovoltaic device according to claim 17, wherein said polymer containing optionally substituted 3,4-alkylenedioxythiophene structural units is a polythiophene according to formula (IV)

(IV)

in which X and Y are O; Z is —$(CH_2)_m$—$CR^3R^4$—$(CH_2)_n$—; $R^3$ is hydrogen or —$(CH_2)_s$—O—$(CH_2)_p$—$SO_3^-M^+$; $R^4$ is —$(CH_2)_s$—O—$(CH_2)_p$—$SO_3^-M^+$; $M^+$ is a cation; m and n are independently a whole number from 0 to 3; s is a whole number from 0 to 10; and p is a whole number from 1 to 18; and q is a whole number from 2 to 10,000.

20. Photovoltaic device according to claim 17, wherein said polymer containing optionally substituted 3,4-alkylenedioxythiophene structural units is poly[4-(2,3-dihydrothieno[3,4-b][1,4]dioxin-2-ylmethoxy)-butane-1-sulphonic acid].

21. Photovoltaic device according to claim 17, wherein said polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxy-thiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives and copolymers therewith.

22. Photovoltaic device according to claim 17, wherein said polymer containing optionally substituted 3,4-alkylenedioxythiophene structural units is poly(3,4-ethylenedioxythiophene).

23. Photovoltaic device according to claim 17, wherein said layer further contains a polyanion.

24. Photovoltaic device according to claim 23, wherein said polyanion is poly(styrene sulphonate).

25. A solar cell consisting of a layer configuration on a support, said layer configuration comprising a layer containing a polymer containing optionally substituted 3,4-alkylenedioxy-thiophene structural units, in which said two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

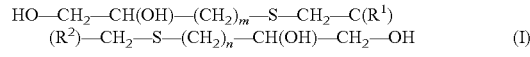
(I)

wherein $R^1$ and $R^2$ are independently H, —OH or alkyl, and n and m are independently 1, 2 or 3; compounds according to formula (II):

(II)

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

26. Solar cell according to claim 25, wherein said optionally substituted 3,4-alkylenedioxythiophene structural units are represented by formula (III):

(III)

in which X and Y are O, Z is —$(CH_2)_m$—$CR^3R^4$—$(CH_2)_n$; $R^3$ is hydrogen or —$(CH_2)_s$—O—$(CH_2)_p$—$SO_3^-M^+$; $R^4$ is —$(CH_2)_s$—O—$(CH_2)_p$—$SO_3^-M^+$; $M^+$ is a cation; m and n are independently a whole number from 0 to 3; s is a whole number from 0 to 10; and p is a whole number from 1 to 18.

27. Solar cell according to claim 25, wherein said polymer containing optionally substituted 3,4-alkylenedioxythiophene structural units is a polythiophene according to formula (IV)

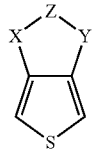

(III)

in which X and Y are O, Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18.

35. Transistor according to claim 33, wherein said polymer containing optionally substituted 3,4-alkylenedioxythiophene structural units is a polythiophene according to formula (IV)

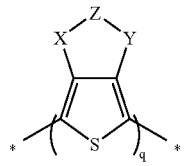

(IV)

in which X and Y are O; Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18; and q is a whole number from 2 to 10,000.

36. Transistor according to claim 33, wherein said polymer containing optionally substituted 3,4-alkylenedioxythiophene structural units is poly[4-(2,3-dihydro-thieno[3,4-b][1,4]dioxin-2-ylmethoxy)-butane-1-sulphonic acid].

37. Transistor according to claim 33, wherein said polymer is selected from the group consisting of: poly(3,4-methylene-dioxythiophene), poly(3,4-methylenedioxythiophene) derivatives, poly(3,4-ethylenedioxythiophene), poly(3,4-ethylenedioxythiophene) derivatives, poly(3,4-propylenedioxy-thiophene), poly(3,4-propylenedioxythiophene) derivatives, poly(3,4-butylenedioxythiophene), poly(3,4-butylenedioxy-thiophene) derivatives and copolymers therewith.

38. Transistor according to claim 33, wherein said polymer containing optionally substituted 3,4-alkylenedioxythiophene structural units is poly(3,4-ethylenedioxythiophene).

39. Transistor according to claim 33, wherein said layer further contains a polyanion.

40. Transistor according to claim 39, wherein said polyanion is poly(styrene sulphonate).

41. An electroluminescent device consisting of a layer configuration on a support, said layer configuration comprising a layer containing a polymer containing optionally substituted 3,4-alkylenedioxythiophene structural units, in which said two alkoxy groups may be the same or different or together represent an optionally substituted oxy-alkyleneoxy bridge, and a compound selected from the group consisting of polyphosphoric acids, polyphosphoric acid salts, thia-alkanedicarboxylic acids, cyclohexadiene compounds

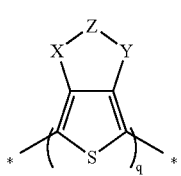

(IV)

in which X and Y are O; Z is —(CH$_2$)$_m$—CR$^3$R$^4$—(CH$_2$)$_n$—; R$^3$ is hydrogen or —(CH$_2$)$_s$—O—(CH$_2$)$_p$—SO$_3$$^-$M$^+$; R$^4$ is —(CH$_2$)$_s$—O—(CH$_2$)$_p$—SO$_3$$^-$M$^+$; M$^+$ is a cation; m and n are independently a whole number from 0 to 3; s is a whole number from 0 to 10; and p is a whole number from 1 to 18; and q is a whole number from 2 to 10,000.

28. Solar cell according to claim 25, wherein said polymer containing optionally substituted 3,4-alkylenedioxythiophene structural units is poly[4-(2,3-dihydro-thieno[3,4-b][1,4]dioxin-2-ylmethoxy)-butane-1-sulphonic acid].

29. Solar cell according to claim 25, wherein said polymer is selected from the group consisting of: poly(3,4-methylene-dioxythiophene), poly(3,4-methylenedioxythiophene) derivatives, poly(3,4-ethylenedioxythiophene), poly(3,4-ethylenedioxythiophene) derivatives, poly(3,4-propylenedioxy-thiophene), poly(3,4-propylenedioxythiophene) derivatives, poly(3,4-butylenedioxythiophene), poly(3,4-butylenedioxy-thiophene) derivatives and copolymers therewith.

30. Solar cell according to claim 25, wherein said polymer containing optionally substituted 3,4-alkylenedioxythiophene structural units is poly(3,4-ethylenedioxythiophene).

31. Solar cell according to claim 25, wherein said layer further contains a polyanion.

32. Solar cell according to claim 31, wherein said polyanion is poly(styrene sulphonate).

33. A transistor consisting of a layer configuration on a support, said layer configuration comprising a layer containing a polymer containing optionally substituted 3,4-alkylenedioxy-thiophene structural units, in which said two alkoxy groups may be the same or different or together represent an optionally substituted oxy-alkylene-oxy bridge, and a compound selected from the group consisting of polyphosphoric acids, polyphosphoric acid salts, thia-alkanedicarboxylic acids, cyclohexadiene compounds and polyhydroxy-compounds selected from the group consisting of tetronic acid derivatives; ortho-dihydroxybenzene compounds with at least one sulpho group, compounds according to formula (I):

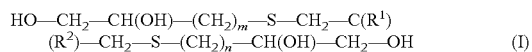

(I)

wherein R$^1$ and R$^2$ are independently H, —OH or alkyl, and n and m are independently 1, 2 or 3; compounds according to formula (II):

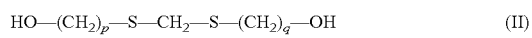

(II)

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

34. Transistor according to claim 33, wherein said optionally substituted 3,4-alkylenedioxythiophene structural units are represented by formula (III):

and polyhydroxy-compounds selected from the group consisting of tetronic acid derivatives; ortho-dihydroxybenzene compounds with at least one sulpho group, compounds according to formula (I):

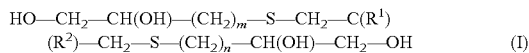   (I)

wherein $R^1$ and $R^2$ are independently H, —OH or alkyl, and n and m are independently 1, 2 or 3; compounds according to formula (II):

   (II)

wherein p and q are independently 2, 3 or 4; compounds hydrolyzable to tetronic acid derivatives; compounds hydrolyzable to compounds according to formula (I); and sulpho-substituted 2-thia-alkyl-benzimidazole compounds.

42. Electroluminescent device according to claim 41, wherein said optionally substituted 3,4-alkylenedioxythiophene structural units are represented by formula (III):

   (III)

in which X and Y are O, Z is —$(CH_2)_m$—$CR^3R^4(CH_2)_n$—; $R^3$ is hydrogen or —$(CH_2)_s$—O—$(CH_2)_p$—$SO_3^-M^+$; $R^4$ is —$(CH_2)_s$—O—$(CH_2)_p$—$SO_3^-M^+$; $M^+$ is a cation; m and n are independently a whole number from 0 to 3; s is a whole number from 0 to 10; and p is a whole number from 1 to 18.

43. Electroluminescent device according to claim 41, wherein said polymer containing optionally substituted 3,4-alkylenedioxythiophene structural units is a polythiophene according to formula (IV)

   (IV)

in which X and Y are O; Z is —$(CH_2)_m$—$CR^3R^4$—$(CH_2)_n$—; $R^3$ is hydrogen or —$(CH_2)_s$—O—$(CH_2)_p$—$SO_3^-M^+$; $R^4$ is —$(CH_2)_s$—O —$(CH_2)_p$—$SO_3^-M^+$; $M^+$ is a cation; m and n are independently a whole number from 0 to 3; s is a whole number from 0 to 10; and p is a whole number from 1 to 18; and q is a whole number from 2 to 10,000.

44. Electroluminescent device according to claim 41, wherein said polymer containing optionally substituted 3,4-alkylenedioxy-thiophene structural units is poly[4-(2,3-dihydro-thieno[3,4-b][1,4]dioxin-2-ylmethoxy)-butane-1-sulphonic acid].

45. Electroluminescent device according to claim 41, wherein said polymer is selected from the group consisting of: poly(3,4-methylenedioxy-thiophene), poly(3,4-methylenedioxythiophene) derivatives, poly(3,4-ethylenedioxythiophene), poly(3,4-ethylenedioxythiophene) derivatives, poly(3,4-propylenedioxy-thiophene), poly(3,4-propylenedioxythiophene) derivatives, poly(3,4-butylenedioxythiophene), poly(3,4-butylenedioxy-thiophene) derivatives and copolymers therewith.

46. Electroluminescent device according to claim 41, wherein said polymer containing optionally substituted 3,4-alkylenedioxy-thiophene structural units is poly(3,4-ethylenedioxy-thiophene).

47. Electroluminescent device according to claim 41, wherein said layer further contains a polyanion.

48. Electroluminescent device according to claim 47, wherein said polyanion is poly(styrene sulphonate).

* * * * *